United States Patent
Shishido et al.

(10) Patent No.: US 12,464,229 B2
(45) Date of Patent: Nov. 4, 2025

(54) IMAGING ELEMENT CONTROL METHOD AND CAMERA SYSTEM HAVING LOW POWER CONSUMPTION MODE

(71) Applicant: Panasonic Intellectual Property Management Co., Ltd., Osaka (JP)

(72) Inventors: Sanshiro Shishido, Osaka (JP); Shinichi Machida, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 69 days.

(21) Appl. No.: 18/664,343

(22) Filed: May 15, 2024

(65) Prior Publication Data

US 2024/0305881 A1     Sep. 12, 2024

Related U.S. Application Data

(63) Continuation of application No. PCT/JP2022/042238, filed on Nov. 14, 2022.

(30) Foreign Application Priority Data

Dec. 1, 2021    (JP) .................................. 2021-195520

(51) Int. Cl.
    *H04N 23/65*       (2023.01)
    *H04N 23/667*      (2023.01)
    (Continued)

(52) U.S. Cl.
    CPC ......... *H04N 23/651* (2023.01); *H04N 23/667* (2023.01); *H04N 25/63* (2023.01);
    (Continued)

(58) Field of Classification Search
    None
    See application file for complete search history.

(56) References Cited

U.S. PATENT DOCUMENTS

2005/0194624 A1*   9/2005   Kobayashi ............ H10F 39/195
                                                         257/292
2014/0027618 A1*   1/2014   Goto ..................... H10F 39/802
                                                         250/208.1
(Continued)

FOREIGN PATENT DOCUMENTS

EP           3389103 A1     10/2018
JP          2005-252322      9/2005
(Continued)

OTHER PUBLICATIONS

The EPC Office Action dated Jan. 8, 2025 for the related European Patent Application No. 22901065.7.
(Continued)

*Primary Examiner* — Paul M Berardesca
(74) *Attorney, Agent, or Firm* — Rimon P.C.

(57) ABSTRACT

A control method for an imaging element is a control method for an imaging element including a photoelectric converter and a peripheral circuit connected to the photoelectric converter. The control method for the imaging element includes receiving a predetermined input signal, and controlling the imaging element by switching between a normal imaging mode and a low power consumption mode based on the predetermined input signal. In the normal imaging mode, the imaging element is controlled to apply first voltage between the first electrode and the second electrode. In the low power consumption mode, the imaging element is controlled to apply second voltage between the first electrode and the second electrode and to stop part of operation of the peripheral circuit, the second voltage being larger than 0 V and smaller than the first voltage.

8 Claims, 16 Drawing Sheets

(51) Int. Cl.
  *H04N 25/63*     (2023.01)
  *H04N 25/65*     (2023.01)
  *H04N 25/709*    (2023.01)
  *H04N 25/79*     (2023.01)
  *H10F 39/00*     (2025.01)

(52) U.S. Cl.
  CPC ........... *H04N 25/65* (2023.01); *H04N 25/709* (2023.01); *H04N 25/79* (2023.01); *H10F 39/809* (2025.01)

(56) References Cited

U.S. PATENT DOCUMENTS

| | | | |
|---|---|---|---|
| 2016/0014364 A1* | 1/2016 | Tashiro | H04N 25/587 348/300 |
| 2016/0037070 A1 | 2/2016 | Mandelli | |
| 2016/0116612 A1* | 4/2016 | Lee | G01T 1/247 378/62 |
| 2016/0119562 A1 | 4/2016 | Takase et al. | |
| 2016/0316547 A1 | 10/2016 | Wayama et al. | |
| 2017/0263669 A1* | 9/2017 | Tamaki | H10F 39/8033 |
| 2018/0020171 A1 | 1/2018 | Miyake et al. | |
| 2018/0227526 A1* | 8/2018 | Tokuhara | H10F 39/192 |
| 2018/0294316 A1 | 10/2018 | Tokuhara et al. | |
| 2019/0189827 A1* | 6/2019 | Haraguchi | H04N 25/683 |
| 2019/0244987 A1 | 8/2019 | Murakami et al. | |
| 2019/0306442 A1 | 10/2019 | Murakami et al. | |
| 2021/0084248 A1 | 3/2021 | Okada et al. | |
| 2021/0327961 A1* | 10/2021 | Moriwaki | H10F 39/811 |
| 2021/0337155 A1* | 10/2021 | Chu | H04N 23/57 |
| 2021/0375998 A1 | 12/2021 | Shishido et al. | |
| 2022/0367572 A1 | 11/2022 | Moriwaki | H10F 39/807 |
| 2023/0283927 A1* | 9/2023 | Yokoyama | H04N 25/63 |

FOREIGN PATENT DOCUMENTS

| | | |
|---|---|---|
| JP | 2010-158292 | 7/2010 |
| JP | 2011-216723 | 10/2011 |
| JP | 2016-086407 | 5/2016 |
| JP | 2016-208498 | 12/2016 |
| JP | 2018-182314 | 11/2018 |
| JP | 2019-054499 | 4/2019 |
| JP | 2019-140673 | 8/2019 |
| WO | 2017/094229 | 6/2017 |
| WO | 2020/225987 | 11/2020 |

OTHER PUBLICATIONS

International Search Report of PCT application No. PCT/JP2022/042238 dated Jan. 24, 2023.

Christopher Gregory et al., "Colloidal Quantum Dot Photodetectors for Large Format NIR, SWIR, and eSWIR Imaging Arrays" SID 2021 DIGEST, vol. 52, Issue 1, Jun. 28, 2021, pp. 982-986.

* cited by examiner

[ t < t1 ]

[ t = t2 ]

[ t = t3 ]

[ t > t3 ]

IMAGING ELEMENT CONTROL METHOD AND CAMERA SYSTEM HAVING LOW POWER CONSUMPTION MODE

BACKGROUND

1. Technical Field

The present disclosure relates to an imaging element control method and a camera system.

2. Description of the Related Art

Conventionally, an imaging element in which a photoelectric conversion layer is stacked on a semiconductor substrate provided with a readout circuit has been known. An imaging element in which a photoelectric conversion layer is stacked on a semiconductor substrate provided with a readout circuit is also called a stacking-type image sensor. When imaging is performed by using such a stacking-type image sensor, predetermined bias voltage is applied to the photoelectric conversion layer. For example, Japanese Unexamined Patent Application Publication No. 2018-182314 discloses a stacking-type image sensor that changes the magnitude of the bias voltage in a duration in which a pixel signal from each pixel is read.

SUMMARY

In one general aspect, the techniques disclosed here feature a control method for an imaging element including a photoelectric converter and a peripheral circuit connected to the photoelectric converter, the photoelectric converter including a first electrode, a second electrode facing the first electrode, and a photoelectric conversion layer disposed between the first electrode and the second electrode, and the control method includes receiving a predetermined input signal and controlling the imaging element by switching between a normal imaging mode and a low power consumption mode based on the predetermined input signal. In the normal imaging mode, the imaging element is controlled to apply first voltage between the first electrode and the second electrode. In the low power consumption mode, the imaging element is controlled to apply second voltage between the first electrode and the second electrode and to stop part of operation of the peripheral circuit, the second voltage being larger than 0 V and smaller than the first voltage.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

In a stacking-type image sensor, decrease of the reliability of the imaging element, such as decrease of the image quality of a captured image, occurs when the photoelectric conversion layer degrades. A camera system using a stacking-type image sensor is typically connected to a fixed power source when driven, but has been increasingly driven by using a battery, and thus reduction of its electric power consumption has been desired for operation with limited battery capacity.

The present disclosure provides an imaging element control method and a camera system with which it is possible to improve reliability of an imaging element and reduce electric power consumption thereof.

Background to an Aspect of the Present Disclosure

Before specific description of an embodiment of the present disclosure, background to an aspect of the present disclosure will be described below.

In a stacking-type image sensor, pairs of electric charge as carriers are generated in a photoelectric conversion layer when the photoelectric conversion layer is irradiated with light, and current continuously flows to the photoelectric conversion layer even when a readout circuit does not perform readout operation. In the following description, current that flows when photoelectric conversion layer is irradiated with light is also referred to as "light current". Current flows to the photoelectric conversion layer even when the photoelectric conversion layer is not irradiated with light, which affects an imaging element characteristic. In the following description, current that flows when the photoelectric conversion layer is not irradiated with light is also referred to as "dark current". In particular, dark current is likely to occur in a case where the photoelectric conversion layer has defect or the like.

Figure 1:
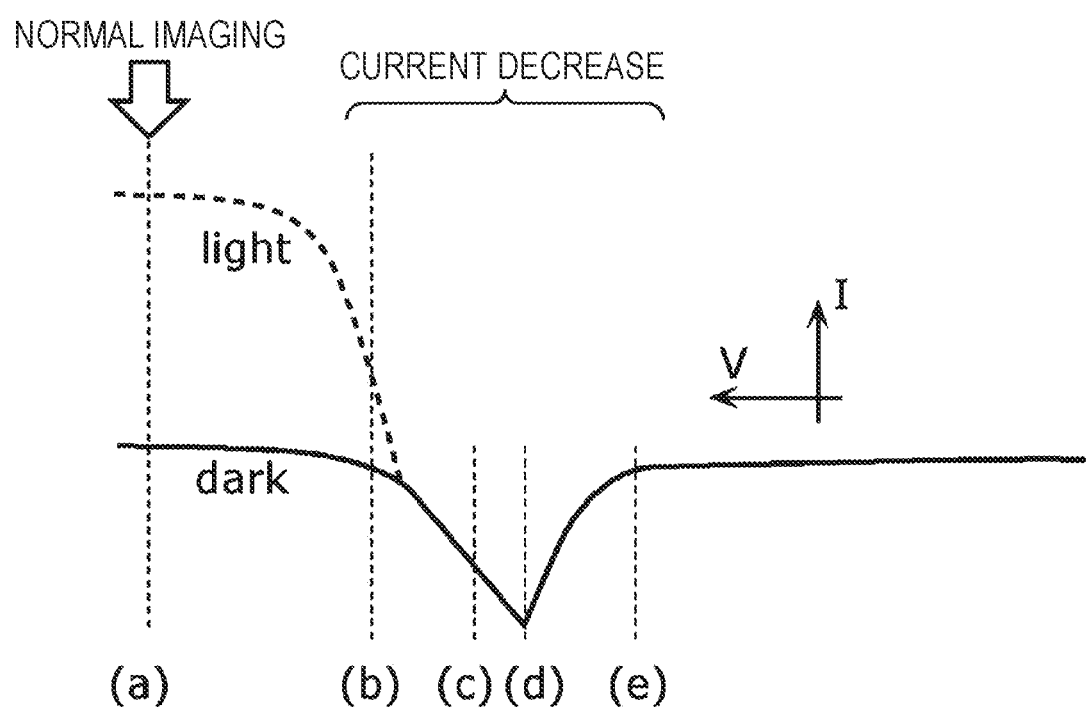
FIG. 1 is a diagram illustrating an example of the current-voltage characteristic of an element including a photoelectric conversion layer.

Characteristics of current flowing to a photoelectric conversion layer will be described below with reference to FIG. 1. FIG. 1 is a diagram illustrating an example of the current-voltage characteristic of an element including a photoelectric conversion layer. The characteristic illustrated in FIG. 1 is evaluated by using, for example, a test element in which a pair of electrodes and a photoelectric conversion layer sandwiched between the pair of electrodes are formed on a glass substrate. For example, since small electrodes of several μm are used in an actual imaging element, a measured current amount is extremely small and thus a relatively large test element is produced to check the current-voltage characteristic. The horizontal axis illustrated in FIG. 1 represents bias voltage applied to the element. The vertical axis illustrated in FIG. 1 represents the absolute value of current flowing between the pair of electrodes. FIG. 1 is a semilogarithmic graph with a logarithm scale on the vertical axis. In FIG. 1, the solid line with "dark" represents the current-voltage characteristic in a dark state in which the element is not irradiated with light. The dashed line with "light" in FIG. 1 represents the current-voltage characteristic in a light state in which the element is irradiated with light of a predetermined intensity. Note that, in the light state, the amount of flowing current changes in accordance with the intensity of light incident on the element.

At photoelectric conversion when an image is acquired, for example, the bias voltage (for example, 5 V approximately) at a position indicated with (a) is applied to the photoelectric conversion layer. Accordingly, light current of carriers generated in accordance with the amount of light incident on the photoelectric conversion layer flows and electric charge is collected by the electrodes. At the bias voltage indicated with (a), current characteristic change is small when electric charge is collected by the electrodes and the bias voltage changes. The readout circuit reads a signal in accordance with the amount of collected electric charge.

In this manner, bias voltage with which sufficient current flows in the light state is applied when imaging is performed by using the stacking-type image sensor. Light current continuously flows to the photoelectric conversion layer even when the readout circuit does not perform readout operation and when an output image is not used. As illustrated in FIG. 1, dark current flows even in the dark state with no light irradiation since the bias voltage indicated with (a) is applied to the photoelectric conversion layer. With such flow of light current and dark current, the photoelectric conversion layer degrades and a reliability problem occurs to an imaging element, and furthermore, electric power consumption increases. In addition, since magnitude is different between light current and dark current, the degree of degradation of the photoelectric conversion layer and electric power consumption largely vary depending on an environment in which the stacking-type image sensor is placed. Thus, in a case where the stacking-type image sensor is disposed at a bright place, the photoelectric conversion layer is likely to degrade and electric power consumption increases, which is a problem.

When the bias voltage (for example, 1 V or lower) at positions indicated with (b) to (e) in FIG. 1 is applied to the photoelectric conversion layer, current flowing to the photoelectric conversion layer is smaller than when the bias voltage indicated with (a) is applied. As a result, degradation of the photoelectric conversion layer is reduced to improve the reliability of the imaging element and electric power consumption is reduced. Moreover, heat generation at the imaging element is reduced. For example, the amount of current flowing to the photoelectric conversion layer is smallest with the bias voltage indicated with (d). The bias voltage with which the current amount is smallest varies in some cases among pixels or depending on characteristics of the photoelectric conversion layer, and thus the amount of current flowing to the photoelectric conversion layer can be reliably reduced with the bias voltage indicated with (b) or (c) with which an operation range can have a margin. The same effect is obtained with the bias voltage between (d) and (e). When the photoelectric conversion layer is regarded as a photodiode, for example, the left side of (d) is voltage of reverse bias and the right side of (d) is voltage of forward bias. Flow of forward current results in degradation of the photoelectric conversion layer in some cases depending on the configuration of the photoelectric conversion layer, and in such a case, voltage of reverse bias on the left side of (d) is preferably applied to the photoelectric conversion layer.

As described above, the inventors of the present application focused on dependency of light current and dark current flowing to a photoelectric conversion layer in a stacking-type image sensor on bias voltage. The inventors of the present application have found that reduction of current flowing to the photoelectric conversion layer by controlling the bias voltage is effective for improving the reliability of the imaging element with reduced degradation of the photoelectric conversion layer and reducing electric power consumption of the imaging element, and have achieved an aspect of the present disclosure. Detailed description will be provided below.

Outline of Present Disclosure

The outline of an aspect of the present disclosure is as follows.

A control method for an imaging element according to an aspect of the present disclosure is a control method for an imaging element including a photoelectric converter and a peripheral circuit connected to the photoelectric converter, the photoelectric converter including a first electrode, a second electrode facing the first electrode, and a photoelectric conversion layer disposed between the first electrode and the second electrode, and the control method includes receiving a predetermined input signal and controlling the imaging element by switching between a normal imaging mode and a low power consumption mode based on the predetermined input signal. In the normal imaging mode, the imaging element is controlled to apply first voltage between the first electrode and the second electrode. In the low power consumption mode, the imaging element is controlled to apply second voltage between the first electrode and the second electrode and to stop part of operation of the peripheral circuit, the second voltage being larger than 0 V and smaller than the first voltage.

Accordingly, upon reception of the predetermined input signal, the normal imaging mode is switched to the low power consumption mode to control the imaging element so that bias voltage applied between the first and second electrodes of the imaging element becomes smaller than in the normal imaging mode while part of operation of the peripheral circuit of the imaging element is stopped. Thus, for example, current flowing to the photoelectric conversion layer decreases, and as a result, degradation of the photoelectric conversion layer is reduced and electric power consumption thereof is reduced. Thus, according to the present aspect, it is possible to improve the reliability of the imaging element and reduce electric power consumption thereof.

For example, in the low power consumption mode, the imaging element may be controlled to apply the second voltage between the first electrode and the second electrode for one frame duration or longer.

Accordingly, current flowing to the photoelectric conversion layer is reduced for one frame duration or longer.

For example, the imaging element further may include a third electrode facing the first electrode with the photoelectric conversion layer interposed between the first electrode and the third electrode. In the normal imaging mode, the imaging element may be controlled to apply third voltage between the first electrode and the third electrode. In the low power consumption mode, the imaging element may be controlled to apply fourth voltage between the first electrode and the third electrode, the fourth voltage being smaller than the third voltage.

Accordingly, current flowing to the photoelectric conversion layer between the first and third electrodes is reduced in the low power consumption mode.

For example, in the low power consumption mode, the imaging element may be controlled to apply the second voltage between the first electrode and the second electrode and to apply the fourth voltage between the first electrode and the third electrode by supplying equal voltage to each of the first electrode and the third electrode.

Accordingly, the fourth voltage is minimized, and thus current flowing to the photoelectric conversion layer between the first and third electrodes is minimized.

For example, the photoelectric converter may have a light current characteristic with a first voltage range in which current density flowing between the first electrode and the second electrode upon voltage application between the first electrode and the second electrode is equivalent between a state with light incidence and a state without light incidence. The second voltage may be included in the first voltage range.

Accordingly, light current is equivalent to dark current, and thus the amount of current flowing to the photoelectric conversion layer is reduced in the low power consumption mode. Moreover, the amount of current flowing to the photoelectric conversion layer does not change whether or not light is incident on the imaging element, and a constant effect of current amount reduction can be obtained irrespective of an environment in which the imaging element is placed.

For example, the second electrode may be connected to an electric charge accumulation part. In the low power consumption mode, the imaging element may be controlled to apply the second voltage between the first electrode and the second electrode by supplying predetermined voltage to the first electrode and then supplying reset voltage for resetting potential of the electric charge accumulation part to the electric charge accumulation part. The predetermined voltage may have a value between the reset voltage and voltage supplied to the first electrode when the first voltage is applied between the first electrode and the second electrode.

When control is performed by switching from the normal imaging mode to the low power consumption mode, the potential of the electric charge accumulation part is higher or lower than the predetermined voltage in accordance with the amount of signal electric charge accumulated in the electric charge accumulation part, and current potentially flows to the photoelectric conversion layer in the opposite direction to that in the normal imaging mode. Such current in the opposite direction is likely to cause degradation of the photoelectric conversion layer. In the low power consumption mode, bias voltage in the same direction as in the normal imaging mode is applied by supplying the predetermined voltage to the first electrode and then supplying the reset voltage to the electric charge accumulation part connected to the second electrode, and accordingly, current in the same direction as in the normal imaging mode flows to the photoelectric conversion layer. In this manner, current flow in the opposite direction is temporary and thus degradation of the photoelectric conversion layer is reduced.

For example, in the low power consumption mode, the imaging element may be controlled to stop part of operation of the peripheral circuit so that no image is output.

Accordingly, no image is output from the imaging element, and thus electric power consumption of the imaging element is further reduced.

A camera system according to an aspect of the present disclosure includes an imaging element and a controller, the imaging element including a photoelectric converter and a peripheral circuit connected to the photoelectric converter, the photoelectric converter including a first electrode, a second electrode facing the first electrode, and a photoelectric conversion layer disposed between the first electrode and the second electrode. The controller receives a predetermined input signal and controls the imaging element by switching between a normal imaging mode and a low power consumption mode based on the predetermined input signal. The controller controls the imaging element to apply first voltage between the first electrode and the second electrode in the normal imaging mode, and controls the imaging element to apply second voltage between the first electrode and the second electrode and to stop part of operation of the peripheral circuit in the low power consumption mode, the second voltage being larger than 0 V and smaller than the first voltage.

Accordingly, upon reception of the predetermined input signal, the controller switches the normal imaging mode to the low power consumption mode and controls the imaging element so that bias voltage applied between the first and second electrodes of the imaging element becomes smaller than in the normal imaging mode while part of operation of the peripheral circuit of the imaging element is stopped. Thus, for example, current flowing to the photoelectric conversion layer decreases, as a result, degradation of the photoelectric conversion layer is reduced and electric power consumption thereof is reduced. Thus, according to the present aspect, it is possible to improve the reliability of the imaging element and reduce electric power consumption thereof.

Embodiments will be described below with reference to the accompanying drawings.

Note that each embodiment described below is a comprehensive or specific example. For example, numerical values, shapes, materials, constituent components, the forms of disposition and connection of constituent components, steps, the order of steps described below in the embodiments are merely exemplary and not intended to limit the present disclosure. Any constituent component not written in independent claims among constituent components in the present embodiment below is described as an optional constituent component. Each drawing does not necessarily precisely illustrated. Thus, for example, scale does not necessarily match among the drawings. Components identical to each other in effect in the drawings are denoted by the same reference sign, and duplicate description thereof is omitted or simplified in some cases.

In the present specification, any term describing the relation between components, any term describing the shape of a component, and any numerical value range are not expressions only indicating strict meanings but are expressions meaning inclusion of substantially equivalent ranges with, for example, the difference of several % approximately.

In the present specification, the terms "upper side" and "lower side" do not mean the upper side (vertically upper side) and the lower side (vertically lower side) in absolute space recognition, but are used as terms defined by a relative positional relation based on the stacking order of a stacked configuration. Specifically, the light receiving side of an imaging element is defined as "upper side", and a side opposite the light receiving side is defined as "lower side". Note that terms such as "upper side" and "lower side" are merely used to designate mutual disposition of members and not intended to limit the posture of the imaging element when used. The terms "upper side" and "lower side" are applied not only to a case where two constituent components are disposed at an interval to each other and another constituent component exists between the two constituent components but also to a case where two constituent components are closely disposed and contact each other.

Embodiment

A camera system according to an embodiment will be described below.

Entire Configuration

Figure 2:
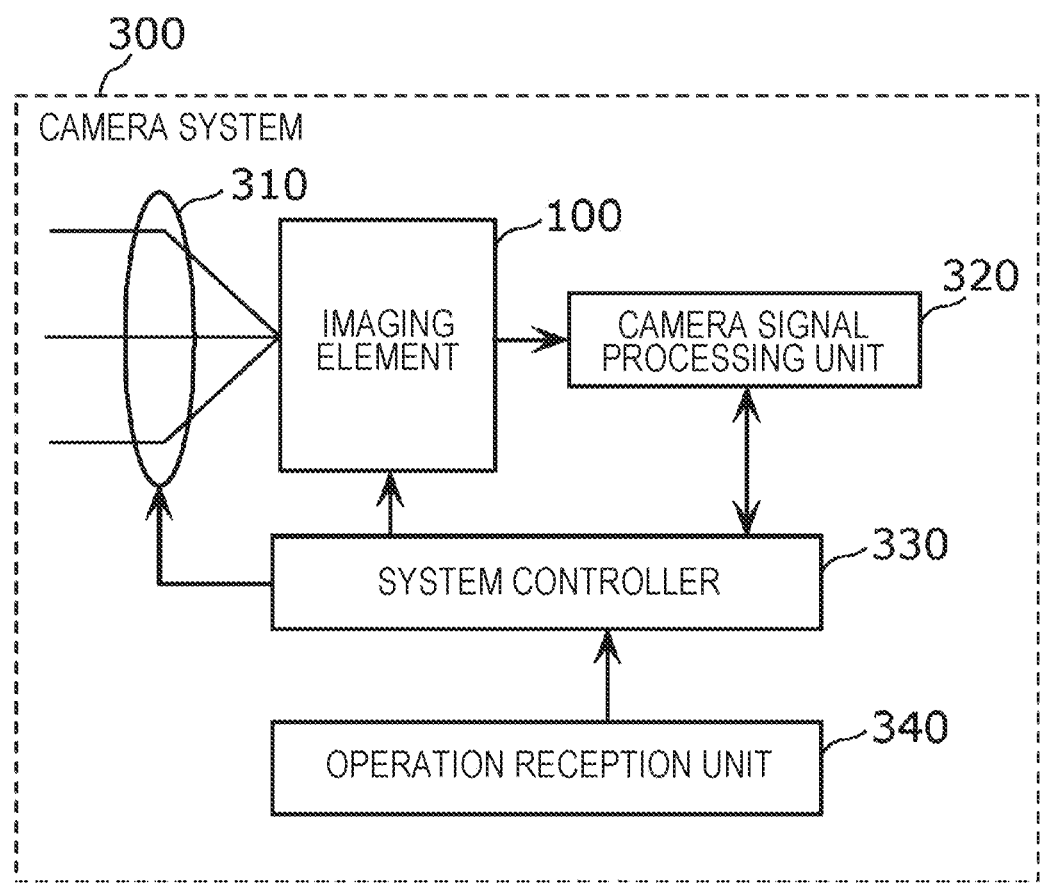
FIG. 2 is a block diagram illustrating a functional configuration of a camera system according to an embodiment.

First, the entire configuration of a camera system 300 according to the embodiment will be described below. FIG. 2 is a block diagram illustrating a functional configuration of the camera system 300 according to the embodiment.

As illustrated in FIG. 2, the camera system 300 includes an imaging element 100, a lens optical system 310, a camera signal processing unit 320, a system controller 330, and an operation reception unit 340. The camera system 300 is used in, for example, a smartphone, a video camera, a digital still camera, a monitoring camera, or an in-car camera.

The imaging element 100 converts light incident on the camera system 300 in to an electric signal and outputs an image (image signal). The imaging element 100 is a stacking-type image sensor in which a photoelectric converter including a photoelectric conversion layer is formed on a semiconductor substrate. The imaging element 100 includes, for example, a photoelectric converter and a peripheral circuit on one semiconductor substrate, the peripheral circuit being configured to perform reading and the like of signal electric charge generated by the photoelectric converter. Details of the configuration of the imaging element 100 will be described later. The imaging element 100 operates based on control by the system controller 330.

The lens optical system 310 is an optical element for guiding incident light to an imaging plane of the imaging element 100. The lens optical system 310 includes, for example, an autofocus lens, a zoom lens, and an aperture.

The camera signal processing unit 320 is a circuit configured to perform various kinds of processing on an image signal generated by the imaging element 100. The camera signal processing unit 320 performs processing such as gamma correction, color interpolation processing, space interpolation processing, automatic white balance, distance measurement calculation, and wavelength information separation. The camera signal processing unit 320 is achieved by, for example, a digital signal processor (DSP).

The system controller 330 controls the entire camera system 300. The system controller 330 is an example of a controller configured to control operation of the imaging element 100, the camera signal processing unit 320, and the lens optical system 310. The system controller 330 outputs, for example, various drive signals to the imaging element 100, the camera signal processing unit 320, and the lens optical system 310. The system controller 330 is achieved by, for example, a microcomputer. Functions of the system controller 330 may be achieved by combination of a general-purpose processing circuit and software or may be achieved by hardware specialized for such processing.

Upon reception of a predetermined input signal, the system controller 330 switches between the normal imaging mode and the low power consumption mode and controls the imaging element 100. The system controller 330 outputs, for example, a power save signal PSV to the imaging element 100. As described above, in the normal imaging mode, bias voltage with which light current of carriers generated in accordance with the amount of light incident on the photoelectric conversion layer sufficiently flows is applied to the photoelectric conversion layer. In the low power consumption mode, bias voltage smaller than in the normal imaging mode is applied to the photoelectric conversion layer.

An image signal processed by the camera signal processing unit 320 is recorded, for example, as a still image or a moving image in a recording medium such as a memory by the system controller 330. The image signal may be displayed as a still image or a moving image on a monitor constituted by a liquid crystal display by the system controller 330.

The operation reception unit 340 receives a user operation related to the camera system 300. The operation reception unit 340 receives from a user, for example, an operation that indicates switching of control of the imaging element 100 between the normal imaging mode and the low power consumption mode. The operation reception unit 340 receives, for example, an operation when the user captures an image by using the camera system 300. The operation reception unit 340 is achieved by, for example, a hardware key such as a touch panel or a press button, which receives a user operation.

Imaging Element

A detailed configuration of the imaging element 100 will be described below.

Figure 3:
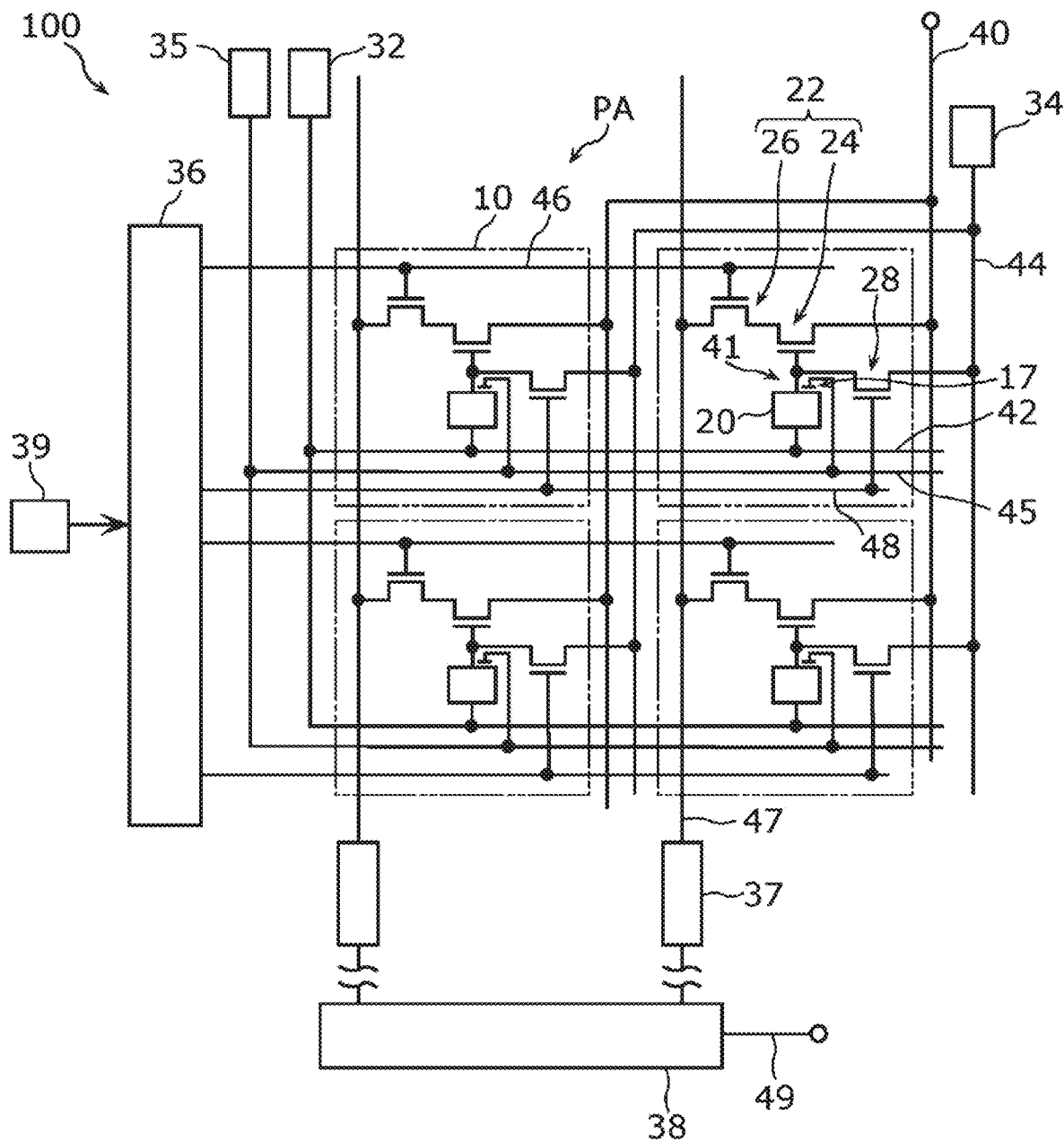
FIG. 3 is a schematic diagram illustrating an exemplary circuit configuration of an imaging element according to the embodiment.

FIG. 3 is a schematic diagram illustrating an exemplary circuit configuration of the imaging element 100 according to the embodiment. The imaging element 100 illustrated in FIG. 3 includes a pixel array PA including a plurality of two-dimensionally arrayed pixels 10. The pixel array PA forms, for example, the imaging plane of the imaging element 100. FIG. 3 schematically illustrates an example in which the pixels 10 are disposed in a matrix of two rows and two columns. The number and disposition of pixels 10 in the imaging element 100 are not limited to the example illustrated in FIG. 3.

Each pixel 10 includes a photoelectric converter 20, a signal detection circuit 22, a reset transistor 28, an electric charge accumulation part 41, and a shield electrode 17.

As described later with reference to the accompanying drawings, the photoelectric converter 20 includes a photoelectric conversion layer 12 sandwiched between two electrodes facing each other, receives incident light, and generates signal electric charge. The entire photoelectric converter 20 does not necessarily need to be an element that is independent for each pixel 10, but for example, part of the photoelectric converter 20 may be provided across a plurality of pixels 10.

The signal detection circuit 22 is a circuit that detects signal electric charge generated by the photoelectric converter 20. In this example, the signal detection circuit 22 includes a signal detection transistor 24 and an address transistor 26. The signal detection transistor 24 and the address transistor 26 are, for example, field effect transistors (FETs). In this example, N-channel metal oxide semiconductor field effect transistors (MOSFETs) are exemplarily illustrated as the signal detection transistor 24 and the address transistor 26. A transistor such as the signal detection transistor 24, the address transistor 26, or the reset transistor 28 to be described later includes a control terminal, an input terminal, and an output terminal. The control terminal is, for example, a gate. The input terminal is one of a drain and a source and is, for example, the drain. The output terminal is the other of the drain and the source and is, for example, the source.

As schematically illustrated in FIG. 3, the control terminal of the signal detection transistor 24 has electrical connection to the photoelectric converter 20. Signal electric charge generated by the photoelectric converter 20 is accumulated at the electric charge accumulation part 41. The electric charge accumulation part 41 expands across a region including a region between the gate of the signal detection transistor 24 and the photoelectric converter 20. Signal electric charge is positive or negative electric charge and is, for example, holes or electrons. The electric charge accumulation part 41 is a part including what is called floating diffusion. The electric charge accumulation part 41 is also called an "electric charge accumulation node". The structure of the photoelectric converter 20 will be described later in detail.

The imaging element 100 includes peripheral circuits that is directly or indirectly connected to the photoelectric converter 20. The peripheral circuits, for example, drive the pixel array PA and acquire an image based on signal electric charge generated by the photoelectric converter 20. The peripheral circuits operate, for example, under control by the system controller 330. The imaging element 100 may include, as one of the peripheral circuits, a control circuit that controls operation of another peripheral circuit. The peripheral circuits include, for example, a voltage supply circuit 32, a voltage supply circuit 35, a reset voltage source 34, a vertical scanning circuit 36, a column signal processing circuit 37, a horizontal signal reading circuit 38, and a pixel drive signal generation circuit 39. The voltage supply circuit 32 and the voltage supply circuit 35 may be provided inside or outside a substrate on which the constituent components of the imaging element 100 are provided. In other words, the voltage supply circuit 32 and the voltage supply circuit 35 may be provided at a component other than a substrate such as a printed substrate or a power source board, on which the constituent components of the imaging element 100 are provided.

The photoelectric converter 20 of each pixel 10 has connection to a sensitivity control line 42. In the configuration exemplarily illustrated in FIG. 3, the sensitivity control line 42 is connected to the voltage supply circuit 32. As described later in detail, the voltage supply circuit 32 supplies voltages that are different from each other between the normal imaging mode and the low power consumption mode to a counter electrode 13 of the photoelectric converter 20 to be described later. The voltage supply circuit 32 includes, for example, two or more voltage sources of different voltages and supplies voltage of either voltage source to the counter electrode 13 by switching transistors or the like. Alternatively, the voltage supply circuit 32 may divide voltage of one voltage source into two or more voltages and supply either voltage to the counter electrode 13.

As described later, the photoelectric converter 20 includes, in addition to the counter electrode 13, a pixel electrode 11 disposed facing the counter electrode 13.

In the configuration exemplarily illustrated in FIG. 3, the shield electrode 17 has connection to a sensitivity control line 45. The sensitivity control line 45 is connected to the voltage supply circuit 35. The voltage supply circuit 35 supplies shield voltage to the shield electrode 17. For example, the shield electrode 17 and the pixel electrode 11 are electrically separated from each other. The voltage supply circuit 35 may supply voltages that are different from each other between the normal imaging mode and the low power consumption mode to the shield electrode 17. For example, the voltage supply circuit 35 includes two or more voltage sources of different voltages and supplies voltage of either voltage source to the shield electrode 17 by switching transistors or the like. Alternatively, the voltage supply circuit 35 may divide voltage of one voltage source into two or more voltages and supply either voltage to the shield electrode 17. Note that the imaging element 100 does not necessarily need to include the shield electrode 17, the sensitivity control line 45, and the voltage supply circuit 35.

The voltage supply circuit 32 and the voltage supply circuit 35 are not limited to particular power circuits but may be circuits that generate predetermined voltage or may be circuits that convert voltage supplied from another power source into the predetermined voltage.

Each pixel 10 has connection to a power source line 40 that supplies power voltage VDD. As illustrated, the input terminal of the signal detection transistor 24 is connected to the power source line 40. The power source line 40 functions as a source follower power source, and accordingly, the signal detection transistor 24 amplifies and outputs signal electric charge generated by the photoelectric converter 20. Specifically, voltage in accordance with the amount of signal electric charge accumulated at the electric charge accumulation part 41 is applied to the control terminal of the signal detection transistor 24. The signal detection transistor 24 amplifies the voltage.

The input terminal of the address transistor 26 is connected to the output terminal of the signal detection transistor 24. The output terminal of the address transistor 26 is connected to one of a plurality of vertical signal lines 47 disposed for each column of the pixel array PA. The control terminal of the address transistor 26 is connected to an address control line 46. Output from the signal detection transistor 24 can be selectively read to the corresponding vertical signal line 47 by controlling the potential of the address control line 46. Specifically, voltage amplified by the signal detection transistor 24 is selectively read as a pixel signal through the address transistor 26 as signal voltage.

In the illustrated example, the address control line 46 is connected to the vertical scanning circuit 36. The vertical scanning circuit 36 is also called a "row scanning circuit". The vertical scanning circuit 36 selects, row by row, a plurality of pixels 10 disposed on the row by applying predetermined voltage to the address control line 46. Accordingly, signal reading from the selected pixels 10 and reset of the electric charge accumulation part 41 to be described later are executed.

In addition, the pixel drive signal generation circuit 39 is connected to the vertical scanning circuit 36. In the illustrated example, the pixel drive signal generation circuit 39 generates a signal that drives pixels 10 disposed on each row of the pixel array PA, and the generated pixel drive signal is supplied to the pixels 10 on the row selected by the vertical scanning circuit 36.

The vertical signal line 47 is a main signal line that transfers pixel signals from the pixel array PA to the peripheral circuits. The column signal processing circuit 37 is connected to the vertical signal line 47. The column signal processing circuit 37 is also called a "row signal accumulation circuit". The column signal processing circuit 37 performs, for example, noise reduction signal processing such as correlated double sampling, and analog-digital conversion (AD conversion). As illustrated, the column signal processing circuit 37 is provided corresponding to each column of pixels 10 of the pixel array PA. The horizontal signal reading circuit 38 is connected to the column signal processing circuits 37. The horizontal signal reading circuit 38 is also called a "column scanning circuit". The horizontal signal reading circuit 38 sequentially reads signals from a plurality of column signal processing circuits 37 to a horizontal common signal line 49. The imaging element 100 may be driven in a global shutter scheme or a rolling shutter scheme.

In the configuration exemplarily illustrated in FIG. 3, each pixel 10 includes the reset transistor 28. Similarly to the signal detection transistor 24 and the address transistor 26, the reset transistor 28 may be a field effect transistor, for example. An example in which an N-channel MOSFET is applied as the reset transistor 28 is described below unless otherwise stated. As illustrated, the reset transistor 28 is connected between a reset voltage line 44 that supplies reset voltage Vr and the electric charge accumulation part 41. The control terminal of the reset transistor 28 is connected to a reset control line 48. The potentials of the pixel electrode 11 and the electric charge accumulation part 41 can be reset to the reset voltage Vr by controlling the potential of the reset control line 48. In this example, the reset control line 48 is connected to the vertical scanning circuit 36. Thus, a plurality of pixels 10 disposed on each row can be reset row by row as the vertical scanning circuit 36 applies predetermined voltage to the reset control line 48.

In this example, the reset voltage line 44 that supplies the reset voltage Vr to the reset transistor 28 is connected to the reset voltage source 34. The reset voltage source 34 is also called a "reset voltage supply circuit". The reset voltage source 34 only needs to have a configuration with which the predetermined reset voltage Vr can be supplied to the reset voltage line 44 at operation of the imaging element 100, and is not limited to a particular power circuit like the above-described voltage supply circuit 32. Each of the voltage supply circuit 32, the voltage supply circuit 35, and the reset voltage source 34 may be part of a single voltage supply circuit or may be independent separate voltage supply circuits. Note that at least one of the voltage supply circuit 32, the voltage supply circuit 35, and the reset voltage source 34 may be part of the vertical scanning circuit 36. Alternatively, sensitivity control voltage from the voltage supply circuit 32, sensitivity control voltage from the voltage supply circuit 35 and/or the reset voltage Vr from the reset voltage source 34 may be supplied to each pixel 10 through the vertical scanning circuit 36.

The power voltage VDD of the signal detection circuit 22 may be used as the reset voltage Vr. In this case, a voltage supply circuit that supplies power voltage to each pixel 10, which is not illustrated in FIG. 3, and the reset voltage source 34 can be shared. Moreover, the power source line 40 and the reset voltage line 44 can be shared, and thus wiring of the pixel array PA can be simplified. However, more flexible control of the imaging element 100 can be performed when the reset voltage Vr is different from the power voltage VDD of the signal detection circuit 22.

Note that the imaging element 100 may include circuits used in a well-known image sensor, which are other than those described above. For example, each pixel 10 may include a feedback circuit for reducing reset noise, and a power circuit or the like for operating the feedback circuit may be included in the peripheral circuits. Moreover, for example, the imaging element 100 may include an overflow transistor, a clip circuit, or the like in the electric charge accumulation part 41. In this case, a maximum value for the potential of the electric charge accumulation part 41 can be defined by setting clip voltage.

Pixel Device Structure

Figure 4:
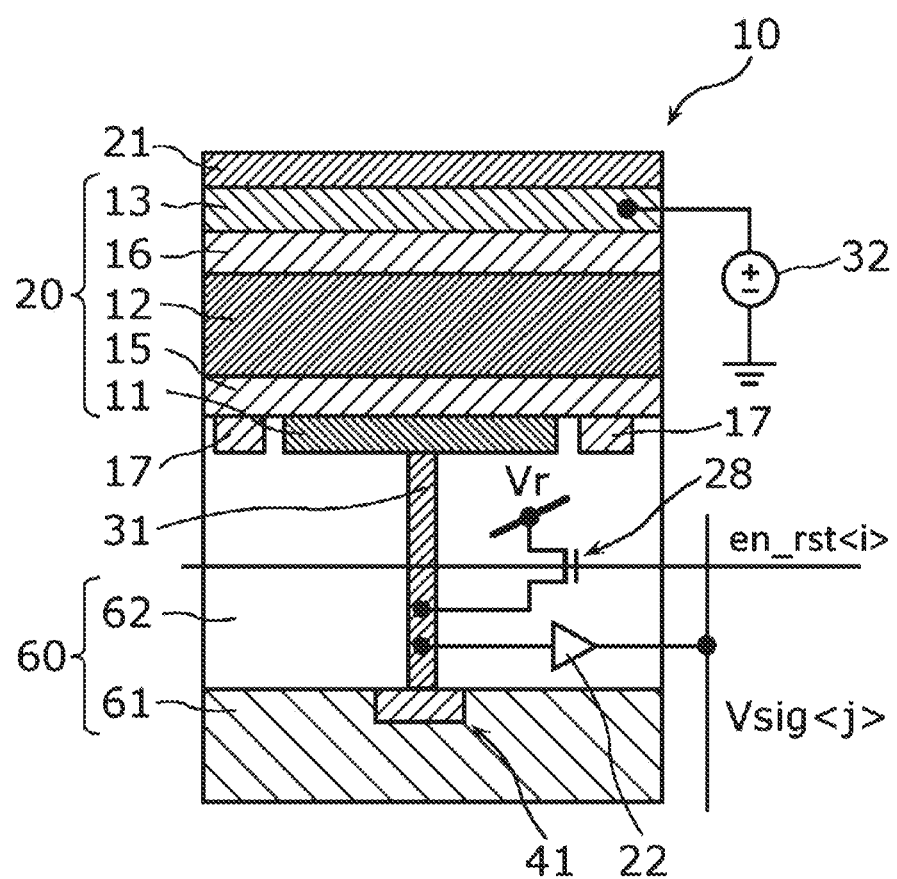
FIG. 4 is a schematic sectional diagram illustrating an exemplary device structure of a pixel according to the embodiment.

A device structure of each pixel 10 of the imaging element 100 will be described below. FIG. 4 is a schematic sectional diagram illustrating an exemplary device structure of each pixel 10 according to the embodiment.

As illustrated in FIG. 4, each pixel 10 includes a complementary metal oxide semiconductor (CMOS) circuit layer 60, the photoelectric converter 20 positioned above the CMOS circuit layer 60, a sealing layer 21 positioned above the photoelectric converter 20, the shield electrode 17, and the electric charge accumulation part 41. The shield electrode 17 is an example of the third electrode. The pixel 10 may further include an optical filter, a micro lens, or the like above the sealing layer 21. Light is incident on the pixel 10 from above the CMOS circuit layer 60.

The photoelectric converter 20 includes the pixel electrode 11 electrically connected to the electric charge accumulation part 41, the counter electrode 13 positioned above the pixel electrode 11 and disposed facing the pixel electrode 11, a photoelectric conversion layer 12 positioned between the pixel electrode 11 and the counter electrode 13, an electron blocking layer 15 positioned between the pixel electrode 11 and the photoelectric conversion layer 12, and a hole blocking layer 16 positioned between the counter electrode 13 and the photoelectric conversion layer 12. The counter electrode 13 is an example of the first electrode. The pixel electrode 11 is an example of the second electrode. In the example illustrated in FIG. 4, the counter electrode 13, the photoelectric conversion layer 12, the electron blocking layer 15, and the hole blocking layer 16 are formed across a plurality of pixels 10.

The CMOS circuit layer 60 includes a semiconductor substrate 61 and an interlayer insulating layer 62 disposed on the semiconductor substrate 61. The semiconductor substrate 61 is, for example, a substrate made of silicon or the like, such as a p-type silicon substrate. The semiconductor substrate 61 is not limited to a substrate entirely made of a semiconductor. The interlayer insulating layer 62 is formed of, for example, an insulating material such as silicon dioxide.

For example, various transistors such as the signal detection circuit 22 and the reset transistor 28, wires such as signal lines, control lines, and power source lines, and the electric charge accumulation part 41, which are described above with reference to FIG. 3 are provided in the CMOS circuit layer 60 although illustration thereof is omitted in FIG. 4 except for some parts. A plug 31 connecting the electric charge accumulation part 41 and the pixel electrode 11 is provided in the interlayer insulating layer 62 of the CMOS circuit layer 60. The plug 31 is formed of a conductive material.

FIG. 4 schematically illustrates the signal detection circuit 22, the reset transistor 28, and a control line and a signal line connected to them. The gate of the reset transistor 28 is connected to a reset control line en_rst for each row. The signal detection circuit 22 outputs a pixel signal to a vertical signal line Vsig for each column. The reset control line en_rst corresponds to the reset control line 48 in FIG. 3. The vertical signal line Vsig corresponds to the vertical signal line 47 in FIG. 3. The pixel array PA is, for example, an array of n rows×m columns and a pixel 10 on the i-the row and the j-th column in the pixel array PA is illustrated in FIG. 4. Accordingly, a reset control line en_rst<i> expresses the reset control line en_rst of the i-th row, and a vertical signal line Vsig<j> expresses the vertical signal line Vsig of the j-th column.

The pixel electrode 11 is an electrode for collecting signal electric charge generated by the photoelectric conversion layer 12. At least one pixel electrode 11 exists for each pixel 10. The pixel electrode 11 is electrically connected to the electric charge accumulation part 41 through the plug 31. Signal electric charge collected by the pixel electrode 11 is accumulated in the electric charge accumulation part 41. The pixel electrode 11 is formed of a conductive material. The conductive material is, for example, metal such as aluminum or copper, metal nitride, or polysilicon provided with conductivity due to doping with impurities.

The photoelectric conversion layer 12 is positioned between the pixel electrode 11 and the counter electrode 13. The photoelectric conversion layer 12 is also positioned between the shield electrode 17 and the counter electrode 13. The photoelectric conversion layer 12 receives incident light and generates hole-electron pairs.

A photoelectric conversion material contained in the photoelectric conversion layer 12 is, for example, an organic semiconductor material, a semiconductor quantum dot, a semiconductor-type carbon nano tube, or a compound semiconductor such as InGaAs (indium gallium arsenic). The photoelectric conversion material may be combination of two or more of an organic semiconductor material, a semiconductor quantum dot, and a semiconductor-type carbon nano tube and may contain a plurality of kinds of organic semiconductor materials or the like.

The photoelectric conversion layer 12 may have absorption, that is, sensitivity in an infrared wavelength range. The bandgap of the photoelectric conversion material is narrower to absorb the infrared wavelength range, and accordingly, dark current is more likely to occur due to heat excitation that in a photoelectric conversion material that absorbs visible light. Thus, significant effects of electric power consumption reduction and reliability improvement due to the low power consumption mode are more easily obtained.

The counter electrode 13 is, for example, a transparent electrode formed of a transparent conductive material. The counter electrode 13 is disposed on a side where light is incident on the photoelectric conversion layer 12. Accordingly, light having transmitted through the counter electrode 13 is incident on the photoelectric conversion layer 12. Note that "transparent" in the present specification means transmission of at least part of light in a wavelength range to be detected, and light transmission in the entire wavelength range of visible light and infrared is not essential. In the present specification, electromagnetic waves including visible light and infrared are expressing as "light" for sake of simplicity.

The counter electrode 13 is formed of transparent conducting oxide (TCO) such as ITO, IZO, AZO, FTO, $SnO_2$, or $TiO_2$, ZnO. Voltage is applied from the voltage supply circuit 32 to the counter electrode 13. Bias voltage that is potential difference between the counter electrode 13 and the pixel electrode 11 can be set and maintained at a desired value by adjusting the voltage applied from the voltage supply circuit 32 to the counter electrode 13.

The counter electrode 13 is formed across a plurality of pixels 10, for example. Thus, voltage of a desired magnitude can be applied across the plurality of pixels 10 all at once from the voltage supply circuit 32. Note that the counter electrode 13 may be separately provided for each pixel 10 as long as voltage of the desired magnitude can be applied from the voltage supply circuit 32. Similarly, each of the photoelectric conversion layer 12, the electron blocking layer 15 and the hole blocking layer 16 may be formed across a plurality of pixels 10 or separately provided for each pixel 10.

In this manner, since the potential of the counter electrode 13 relative to the potential of the pixel electrode 11 is controlled, any of holes and electrons in hole-electron pairs generated in the photoelectric conversion layer 12 through photoelectric conversion can be collected by the pixel electrode 11 as signal electric charge. Moreover, the sensitivity of the photoelectric converter 20 can be adjusted by changing voltage applied to the counter electrode 13. The signal electric charge collected by the pixel electrode 11 is accumulated in the electric charge accumulation part 41 through the plug 31. Voltage in accordance with the signal electric charge accumulated in the electric charge accumulation part 41 is read by the signal detection circuit 22. For example, in a case where holes are used as signal electric charge, the holes can be selectively collected by the pixel electrode 11 by setting the potential of the counter electrode 13 to be higher than the potential of the pixel electrode 11. The following description is made on a case where holes are used as signal electric charge. Note that electrons may be used as signal electric charge, and in this case, the potential of the counter electrode 13 is set to be lower than the potential of the pixel electrode 11.

Voltage applied to the photoelectric conversion layer 12 is the difference between potential Vito of the counter electrode 13 and potential Vfd of the electric charge accumulation part 41. The potential Vfd of the electric charge accumulation part 41 varies with the amount of signal electric charge accumulated in accordance with the amount of light incident on the photoelectric conversion layer 12. Note that, in the dark state as well, the potential Vfd of the electric charge accumulation part 41 varies as dark current flows.

The electron blocking layer 15 has a function to reduce electron injection from the pixel electrode 11 to the photoelectric conversion layer 12. The electron blocking layer 15 transfers holes as signal electric charge generated in the photoelectric conversion layer 12 to the pixel electrode 11. The upper surface of the electron blocking layer 15 is in contact with the photoelectric conversion layer 12. The lower surface of the electron blocking layer 15 is in contact with the pixel electrode 11 and the shield electrode 17.

The hole blocking layer 16 has a function to reduce hole injection from the counter electrode 13 to the photoelectric conversion layer 12. The hole blocking layer 16 transfers electrons as electric charge opposite to signal electric charge generated in the photoelectric conversion layer 12 to the counter electrode 13. The upper surface of the hole blocking layer 16 is in contact with the counter electrode 13. The lower surface of the hole blocking layer 16 is in contact with the photoelectric conversion layer 12.

The material of each of the electron blocking layer 15 and the hole blocking layer 16 is selected from among well-known materials with taken into account, for example, difference from an adjacent layer in junction strength, ionization potential, electron affinity, and the like.

Note that, in a case where electrons are used as signal electric charge, the photoelectric converter 20 may have a configuration in which the electron blocking layer 15 and the hole blocking layer 16 are interchanged with each other.

The shield electrode 17 is disposed facing the counter electrode 13 with the photoelectric conversion layer 12 interposed therebetween. The shield electrode 17 is positioned below the photoelectric converter 20. The shield electrode 17 is in contact with the lower surface of the photoelectric converter 20. Although not illustrated in FIG. 4, the shield electrode 17 has connection to the sensitivity control line 45 as described above and is supplied with voltage from the voltage supply circuit 35 through the sensitivity control line 45. Note that part of the interlayer insulating layer 62 may be disposed between the shield electrode 17 and the photoelectric conversion layer 12. In other words, the shield electrode 17 and the photoelectric conversion layer 12 do not necessarily need to contact each other.

Figure 5:
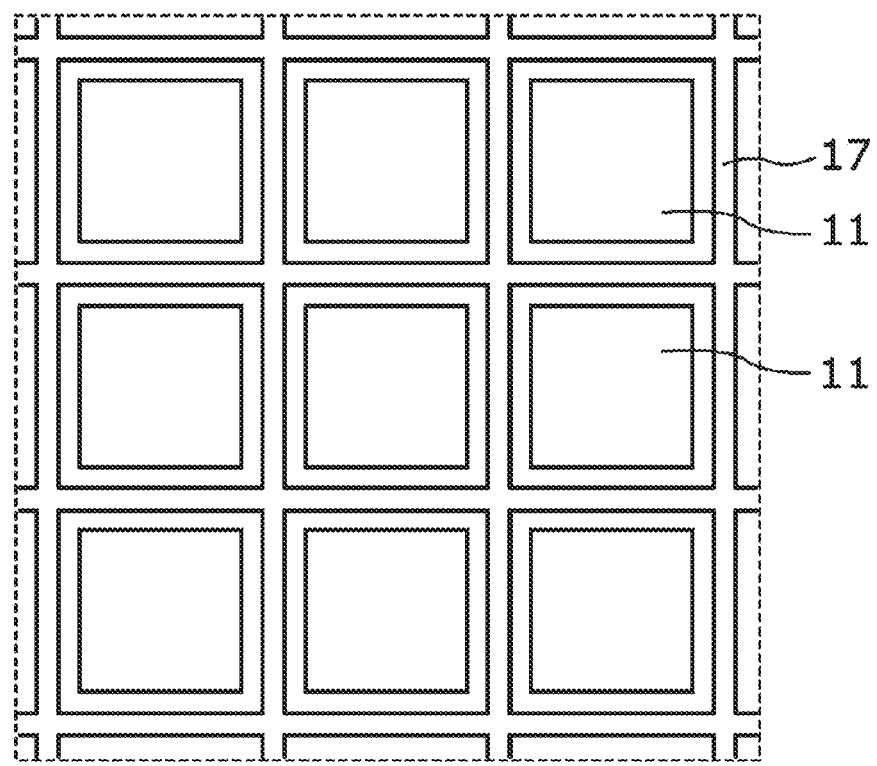
FIG. 5 is a plan view illustrating an example of planar layout of a pixel electrode and a shield electrode according to the embodiment.

The shield electrode 17 and the pixel electrode 11 are separated from each other with part of the interlayer insulating layer 62 interposed therebetween. FIG. 5 is a plan view illustrating an example of planar layout of the pixel electrode 11 and the shield electrode 17. Note that FIG. 5 omits illustration of components other than the pixel electrode 11 and the shield electrode 17.

As illustrated in FIG. 5, the pixel electrodes 11 are arranged, for example, in an array shape. Each shield electrode 17 is disposed between adjacent pixel electrodes 11 in a plan view. For example, the shield electrodes 17 are disposed sandwiching a pixel electrode 11 in a plan view, and specifically, surround the pixel electrode 11. For example, the shield electrodes 17 are formed across a plurality of pixels 10 by batch and have the same potential at the pixels 10. For example, the shield electrodes 17 are disposed in a lattice shape in a plan view and a pixel electrode 11 is disposed in each lattice. In a plan view, the area of the pixel electrode 11 at each pixel 10 is larger than the area of the shield electrode 17. Accordingly, sensitivity decrease can be reduced. Note that the plan view shape of each shield electrode 17 is not particularly limited as along as the shield electrode 17 is disposed between adjacent pixel electrodes 11. For example, each shield electrode 17 may be separately provided in two or more parts.

Each shield electrode 17 is formed of a conductive material. The conductive material is, for example, metal such as aluminum or copper, metal nitride, or polysilicon provided with conductivity due to doping with impurities.

Voltage applied to each shield electrode 17 can be used to reduce signal electric charge movement, what is called crosstalk, between pixels 10. Thus, color mixture can be reduced although the photoelectric conversion layer 12 is not physically separated. The voltage applied to each shield electrode 17 is set such that, for example, the potential thereof becomes higher than the potential of each pixel electrode 11. For example, voltage higher than the reset voltage Vr is applied to the shield electrodes 17. Accordingly, it is possible to prevent holes from becoming more likely to move to the pixel electrodes 11 surrounded by shield electrodes 17 in a plan view and moving to the pixel electrodes 11 of adjacent pixels 10 over the shield electrodes 17.

Voltage applied to each shield electrode 17 may be set such that the potential of the shield electrode 17 becomes lower than the potential of each pixel electrode 11. For example, voltage lower than the reset voltage Vr is applied to the shield electrodes 17. Accordingly, holes moving to the pixel electrodes 11 of adjacent pixels 10 over the shield electrodes 17 in a plan view are collected by the shield electrodes 17, and holes can be prevented from moving to the pixel electrodes 11 of adjacent pixels 10 over the shield electrodes 17.

Note that the imaging element 100 does not necessarily need to include the sensitivity control line 45 and the voltage supply circuit 35, and the shield electrodes 17 may be connected to the ground of the imaging element 100. Crosstalk can be reduced in this manner as well.

The imaging element 100 as described above can be manufactured by using a typical semiconductor manufacturing process. In particular, in a case where a silicon substrate is used as the semiconductor substrate 61, the imaging element 100 can be manufactured by using various kinds of silicon semiconductor processes.

Other Pixel Device Structures

Figure 6:
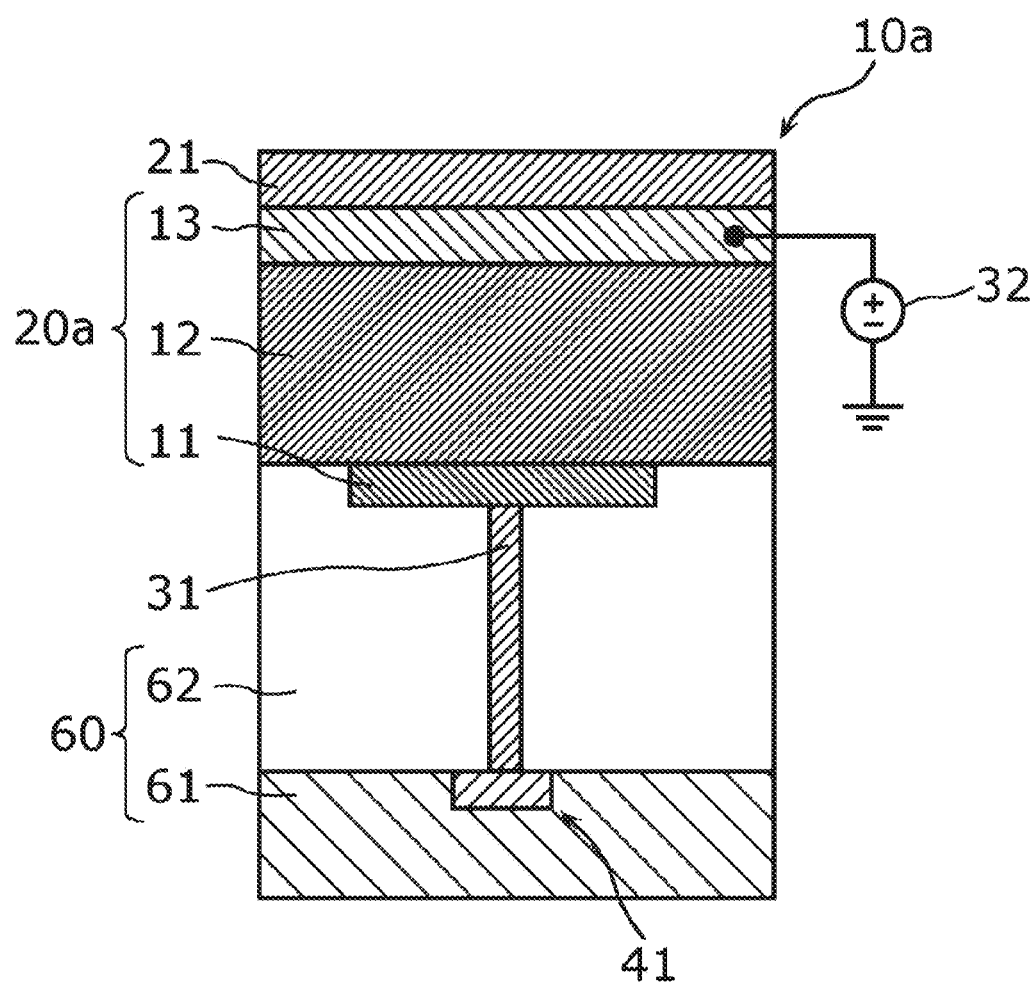
FIG. 6 is a schematic sectional diagram illustrating an exemplary device structure of another pixel according to the embodiment.

Note that the configuration of the imaging element 100 is not limited to the above-described example but may be the configuration of a well-known stacking-type image sensor. For example, the imaging element 100 does not necessarily need to include the electron blocking layer 15, the hole blocking layer 16, and the shield electrodes 17. FIG. 6 is a schematic sectional diagram illustrating another exemplary device structure of a pixel 10a according to the embodiment. Similarly to FIG. 4, FIG. 6 omits illustration of various transistors such as the signal detection circuit 22 and the reset transistor 28 provided in the CMOS circuit layer 60, wires such as signal lines, control lines, and power source lines, the electric charge accumulation part 41, and the like except for some parts.

The imaging element 100 may include the pixel 10a illustrated in FIG. 6 in place of the above-described pixel 10. The pixel 10a is different from the pixel 10 in that the pixel 10a includes a photoelectric converter 20a in place of the photoelectric converter 20 and includes no shield electrode 17. The photoelectric converter 20a includes the pixel electrode 11, the counter electrode 13, and the photoelectric conversion layer 12 but does not include the electron blocking layer 15 nor the hole blocking layer 16. Accordingly, the lower surface of the photoelectric conversion layer 12 is in contact with the pixel electrode 11, and the upper surface of the photoelectric conversion layer 12 is in contact with the counter electrode 13.

Figure 7:
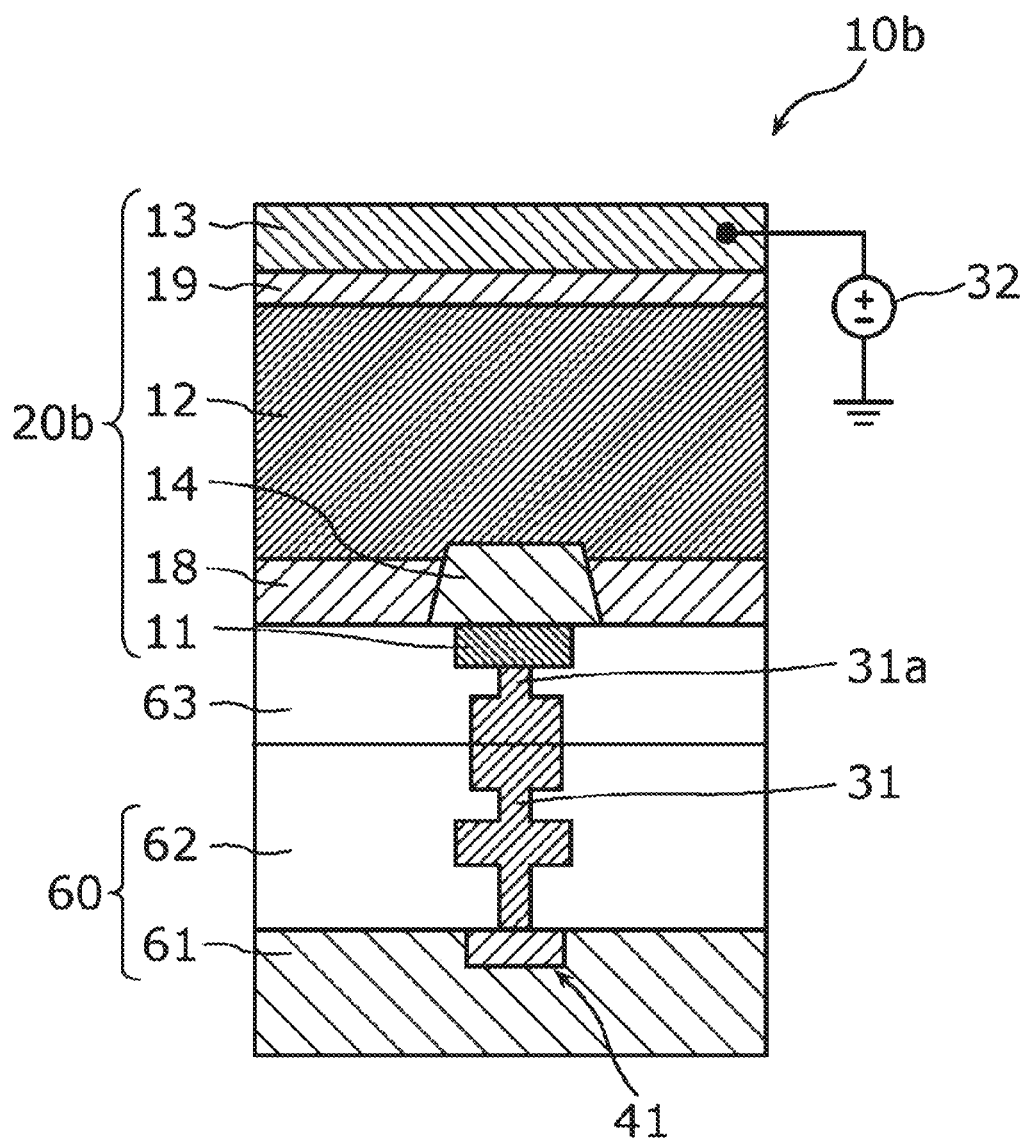
FIG. 7 is a schematic sectional diagram illustrating an exemplary device structure of another pixel according to the embodiment.

The photoelectric conversion layer 12 may be formed of a compound semiconductor such as InGaAs as described above. FIG. 7 is a schematic sectional diagram illustrating another exemplary device structure of a pixel 10b according to the embodiment. Similarly to FIG. 4, FIG. 7 omits illustration of various transistors such as the signal detection circuit 22 and the reset transistor 28 provided in the CMOS circuit layer 60, wires such as signal lines, control lines, and power source lines, the electric charge accumulation part 41, and the like except for parts.

The imaging element 100 may include the pixel 10b illustrated in FIG. 7 in place of the above-described pixel 10. The pixel 10b is different from the pixel 10a in that the pixel 10b includes a photoelectric converter 20b in place of the photoelectric converter 20a, the photoelectric converter 20b including the photoelectric conversion layer 12 formed of a compound semiconductor. The pixel 10b also includes an insulating layer 63 and a plug 31a between the photoelectric converter 20b and the CMOS circuit layer 60.

The photoelectric converter 20b includes the pixel electrode 11, the counter electrode 13, the photoelectric conversion layer 12, a carrier forwarding layer 18 disposed on the pixel electrode 11 and disposed between the pixel electrode 11 and the photoelectric conversion layer 12, a carrier forwarding layer 19 disposed between the counter electrode 13 and the photoelectric conversion layer 12, and an impurity diffusion region 14 in contact with the pixel electrode 11, the photoelectric conversion layer 12, and the carrier forwarding layer 18.

In the photoelectric converter 20b, the photoelectric conversion layer 12 is made of, for example, a compound semiconductor such as n-type InGaAs.

The impurity diffusion region 14 is, for example, a p-type impurity diffusion region doped with p-type impurity such as Zn and has a function to collect signal electric charge. Signal electric charge generated in the photoelectric conversion layer 12 through photoelectric conversion is collected in the impurity diffusion region 14 through diffusion due to bias voltage between the counter electrode 13 and the pixel electrode 11 and concentration difference in signal electric charge therebetween. The signal electric charge collected in the impurity diffusion region 14 is accumulated in the electric charge accumulation part 41 through the pixel electrode 11.

The carrier forwarding layer 18 transfers holes as signal electric charge generated in the photoelectric conversion layer 12 to the pixel electrode 11 and prevents electron injection from the pixel electrode 11 to the photoelectric conversion layer 12. The carrier forwarding layer 19 transfers electrons as electric charge opposite to signal electric charge generated in the photoelectric conversion layer 12 to the counter electrode 13 and prevents hole injection from the counter electrode 13 to the photoelectric conversion layer 12. The carrier forwarding layer 18 and the carrier forwarding layer 19 are made of, for example, an n-type InP.

The photoelectric conversion layer 12 made of n-type InGaAs is formed, for example, through growth on another InP substrate, and the carrier forwarding layer 18 and the carrier forwarding layer 19 function as buffer layers for growing an n-type InGaAs layer in a low-defect manner with lattice constant matching in the formation of the photoelectric conversion layer 12.

The plug 31a is provided in the insulating layer 63 and connects the pixel electrode 11 and the plug 31. For example, metal-metal bonding is formed at the interface between the plug 31a and the plug 31. In a case where the plug 31a and the plug 31 are made of copper (Cu), Cu—Cu bonding is formed at the interface between the plug 31a and the plug 31.

Operation

The operation of the camera system 300 will be described below. The following description is mainly made on a method executed by the system controller 330 to control the imaging element 100 as the operation of the camera system 300.

Figure 8:
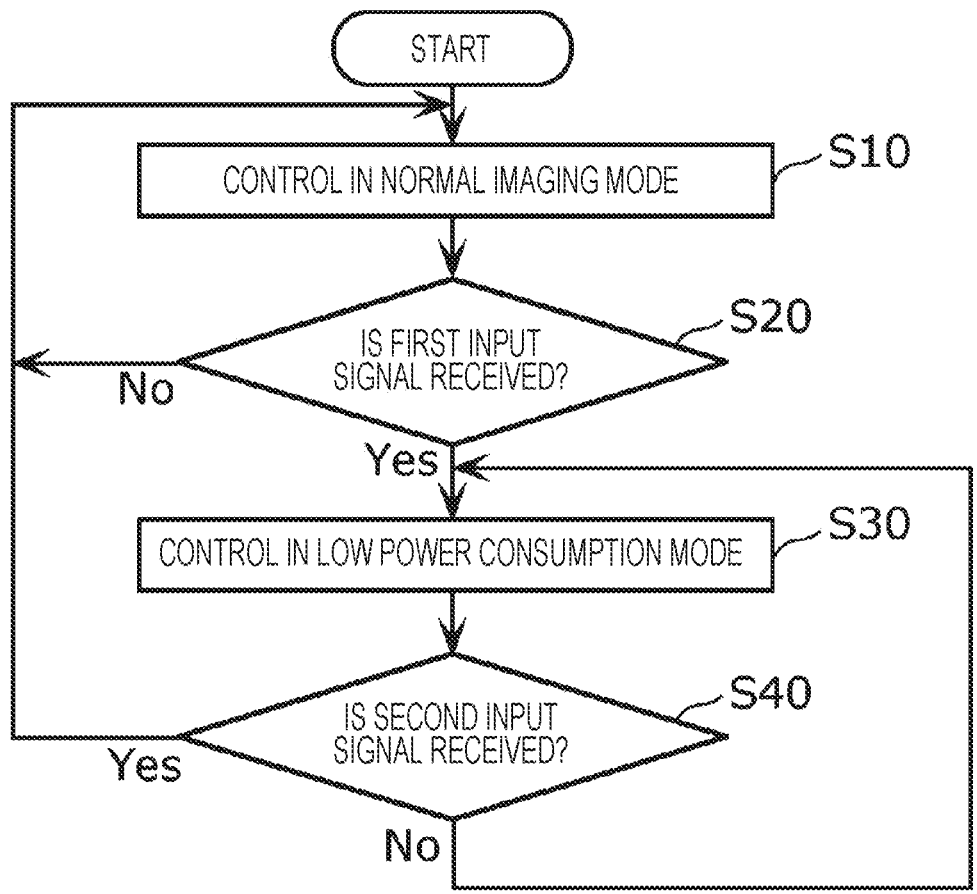
FIG. 8 is a flowchart illustrating exemplary operation of the camera system according to the embodiment.

FIG. 8 is a flowchart illustrating exemplary operation of the camera system 300 according to the embodiment.

As illustrated in FIG. 8, when the camera system 300 is activated, the system controller 330 controls the imaging element 100 in the normal imaging mode, for example (step S10). The normal imaging mode is a mode for acquiring an image by using the camera system 300. Thus, the system controller 330 controls the imaging element 100 to apply not 0 V but first voltage between the pixel electrode 11 and the counter electrode 13, the first voltage being bias voltage with which current flows in accordance with the amount of light incident on the photoelectric conversion layer 12. In other words, the first voltage is bias voltage with which difference occurs between light current and dark current flows between the pixel electrode 11 and the counter electrode 13. Specifically, the system controller 330 controls the imaging element 100 to supply voltage V1 to the counter electrode 13. The potential of the pixel electrode 11 is equal to the potential Vfd of the electric charge accumulation part 41. Thus, the first voltage is the difference between the voltage V1 and the potential Vfd and is the difference between the voltage V1 and the reset voltage Vr at maximum. Note that magnitude comparison among voltages applied between two electrodes, such as the first voltage and second voltage, third voltage, and fourth voltage to be described later is comparison in absolute values without positive and negative signs in the present specification. For example, in a case where negative voltage relative to any one of the electrodes is compared, negatively larger voltage is expressed as larger.

The system controller 330 controls the imaging element 100 to apply the first voltage between the pixel electrode 11 and the counter electrode 13 at least in an exposure duration in the normal imaging mode. In the normal imaging mode, the peripheral circuits of the imaging element 100 normally operate and the imaging element 100 reads a signal in accordance with signal electric charge accumulated in the electric charge accumulation part 41 in the exposure duration and outputs an image.

Subsequently, the system controller 330 determines whether a first input signal is received (step S20). The first input signal is a signal that triggers switching from the normal imaging mode to the low power consumption mode. The first input signal is, for example, a signal indicating that an optional user operation of switching to the low power consumption mode is received by the operation reception unit 340. For example, when the camera system 300 is not to be used, the user performs an operation of switching to the low power consumption mode on the operation reception unit 340. The system controller 330 may receive, as the first input signal, a signal indicating that the camera system 300 is not used. The signal indicating that the camera system 300 is not used is, for example, a signal indicating that no operation is performed on the operation reception unit 340 for a certain time, a signal indicating that no predetermined temporal change occurs to the luminance value of an image output from the imaging element 100, or a signal indicating that the luminance value of an image output from the imaging element 100 is equal to or smaller than a predetermined value.

In a case where the first input signal is not received (No at step S20), the system controller 330 continues control of the imaging element 100 (step S10) in the normal imaging mode.

In a case where the first input signal is received (Yes at step S20), the system controller 330 switches from the normal imaging mode to the low power consumption mode and controls the imaging element 100 (step S30). The system controller 330 outputs the power save signal PSV for performing control in the low power consumption mode to the imaging element 100. Specifically, the system controller 330 controls the imaging element 100 to apply the second voltage between the pixel electrode 11 and the counter electrode 13, the second voltage being larger than 0 V and smaller than the first voltage. In addition to outputting the power save signal PSV for performing control in the low power consumption mode, the system controller 330 may control the lens optical system 310 or the like to reduce or eliminate the amount of light incident on the imaging element 100. Accordingly, light current flowing to the photoelectric conversion layer 12 is further reduced. Details of control in the low power consumption mode will be described later.

Subsequently, the system controller 330 determines whether a second input signal is received (step S40). The second input signal is a signal that triggers switching from the low power consumption mode to the normal imaging mode. The second input signal is, for example, a signal indicating that an optional user operation of switching to the normal imaging mode is received by the operation reception unit 340. For example, when use of the camera system 300 is to be resumed in the low power consumption mode, the user performs an operation of switching to the normal imaging mode on the operation reception unit 340. The system controller 330 may receive, as the second input signal, a signal indicating that use of the camera system 300 is resumed in the low power consumption mode. The signal indicating that use of the camera system 300 is resumed is, for example, a signal indicating that an operation is performed on the operation reception unit 340, a signal indicating variation of the luminance value of an image output from the imaging element 100, or a signal indicating that the luminance value of an image output from the imaging element 100 is equal to or larger than a predetermined value.

In a case where the second input signal is not received (No at step S40), the system controller 330 continues control of the imaging element 100 (step S30) in the low power consumption mode.

In a case where the second input signal is received (Yes at step S40), the system controller 330 switches from the low power consumption mode to the normal imaging mode again and controls the imaging element 100 (step S10).

The camera system 300 performs the above-described operation, for example, until the camera system 300 is completely stopped.

Figure 9:
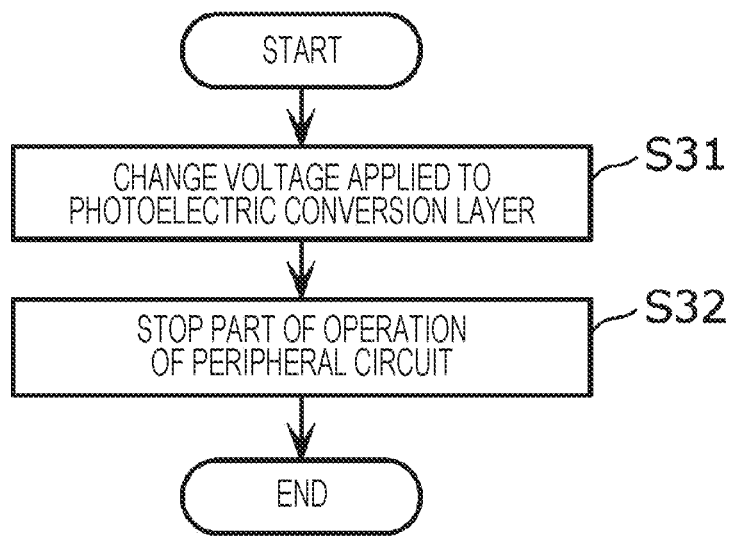
FIG. 9 is a flowchart illustrating exemplary operation of the imaging element according to the embodiment in a low power consumption mode.
Figure 10:
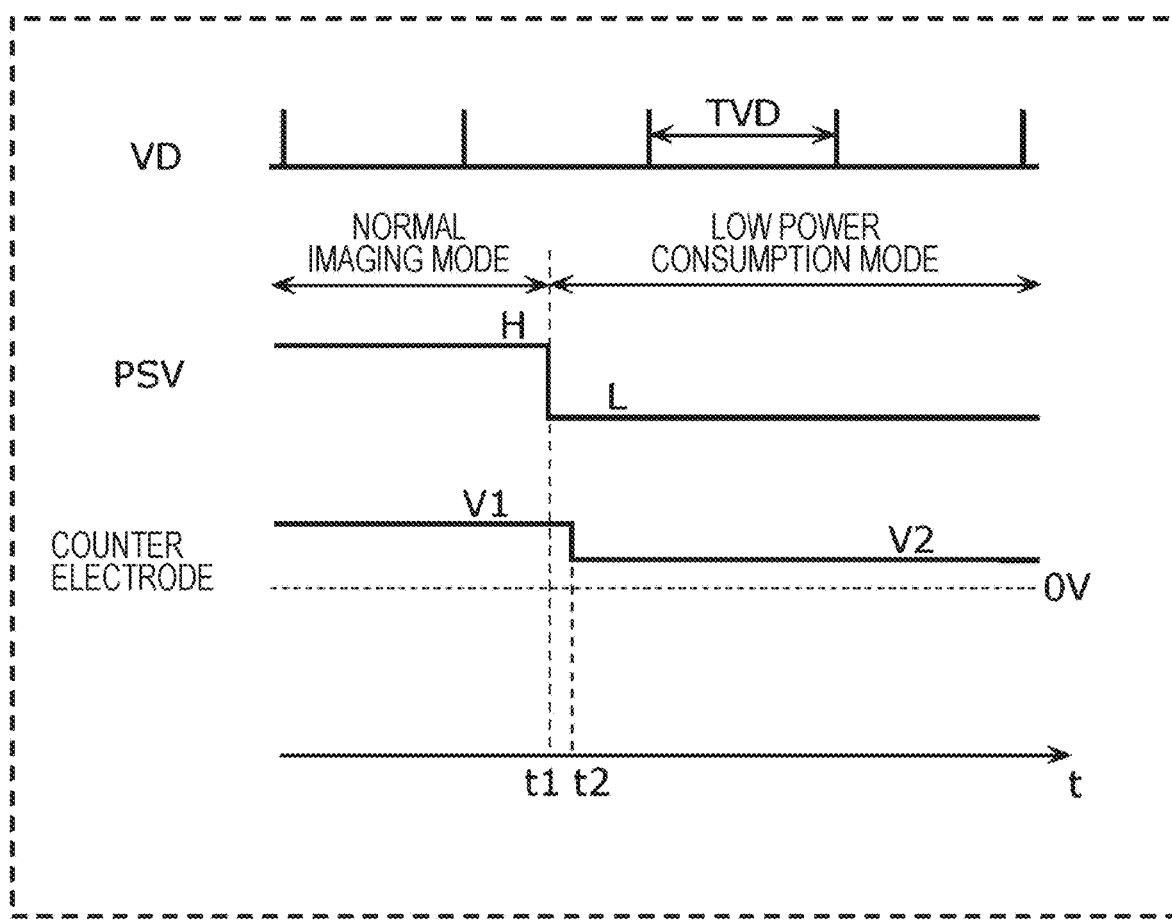
FIG. 10 is a timing chart illustrating a first example of operation timing of the camera system according to the embodiment.

Details of the operation of the imaging element 100 in the low power consumption mode at step S30, specifically, operation performed by the imaging element 100 based on control by the system controller 330 will be described below. The operation performed by the imaging element 100 is operation that the system controller 330 controls the imaging element 100 to perform. FIG. 9 is a flowchart illustrating exemplary operation of the imaging element 100 in the low power consumption mode. FIG. 10 is a timing chart illustrating a first example of the operation timing of the camera system 300. FIG. 10 illustrates, from top, a vertical synchronizing signal VD, the power save signal PSV, and the voltage level of the counter electrode 13. The following description with reference to FIG. 10 is made with an example of the above-described imaging element 100 including the pixels 10, but the same operation is performed also in a case where the imaging element 100 includes the pixels 10a or the pixels 10b.

As illustrated in FIG. 9, first, the imaging element 100 changes voltage applied to the photoelectric conversion layer 12 based on control by the system controller 330 (step S31). Specifically, the imaging element 100 applies, between the counter electrode 13 and the pixel electrode 11, the second voltage that is larger than 0 V and smaller than the first voltage applied in the normal imaging mode. For example, as illustrated in FIG. 10, when having received the first input signal at time t1, the system controller 330 sets the power save signal PSV from a high level to a low level for control in the low power consumption mode and activates the low power consumption mode of the imaging element 100. Then, at time t2 a predetermined transition time after time t1, the imaging element 100 changes voltage supplied to the counter electrode 13 from the voltage V1 to voltage V2. Thus, the second voltage applied between the counter electrode 13 and the pixel electrode 11 is the difference between the voltage V2 and the potential Vfd. In the present embodiment, since signal electric charge is holes, the voltage V2 is voltage lower than the voltage V1. The voltage V2 is, for example, voltage higher than 0 V. In other words, V1>V2>0 V holds. In this manner, in the low power consumption mode, the voltage applied between the counter electrode 13 and the pixel electrode 11 is changed from the first voltage to the second voltage that is smaller than the first voltage. For example, the voltage applied between the counter electrode 13 and the pixel electrode 11 is changed from voltage indicated with (a) in FIG. 1 to voltage in the range indicated with (b) and (c) in FIG. 1. Thus, it is possible to prevent unnecessary current from flowing to the photoelectric conversion layer 12 while the camera system 300 is not used, thereby improving the reliability of the imaging element 100 and reducing electric power consumption thereof. Note that time t1 and time t2 may be the same time point.

In the low power consumption mode, the system controller 330 controls the imaging element 100 to apply the second voltage between the counter electrode 13 and the pixel electrode 11 for one frame duration or longer, that is, for a time corresponding to one frame duration or longer. Accordingly, current flowing to the photoelectric conversion layer 12 is reduced for one frame duration or longer. One frame duration is a duration in which a plurality of pixels 10 are exposed, reading and reset operation of signal electric charge in the electric charge accumulation parts 41 of all pixels 10 is performed sequentially for each pixel row, for example, and signals corresponding to one image are generated. For example, one frame duration in FIG. 10 is the duration of a time TVD between two consecutive rises (or falls) of the vertical synchronizing signal VD, in the vertical synchronizing signal VD in the imaging element 100.

The second voltage applied in the low power consumption mode will be described below.

Figure 11:
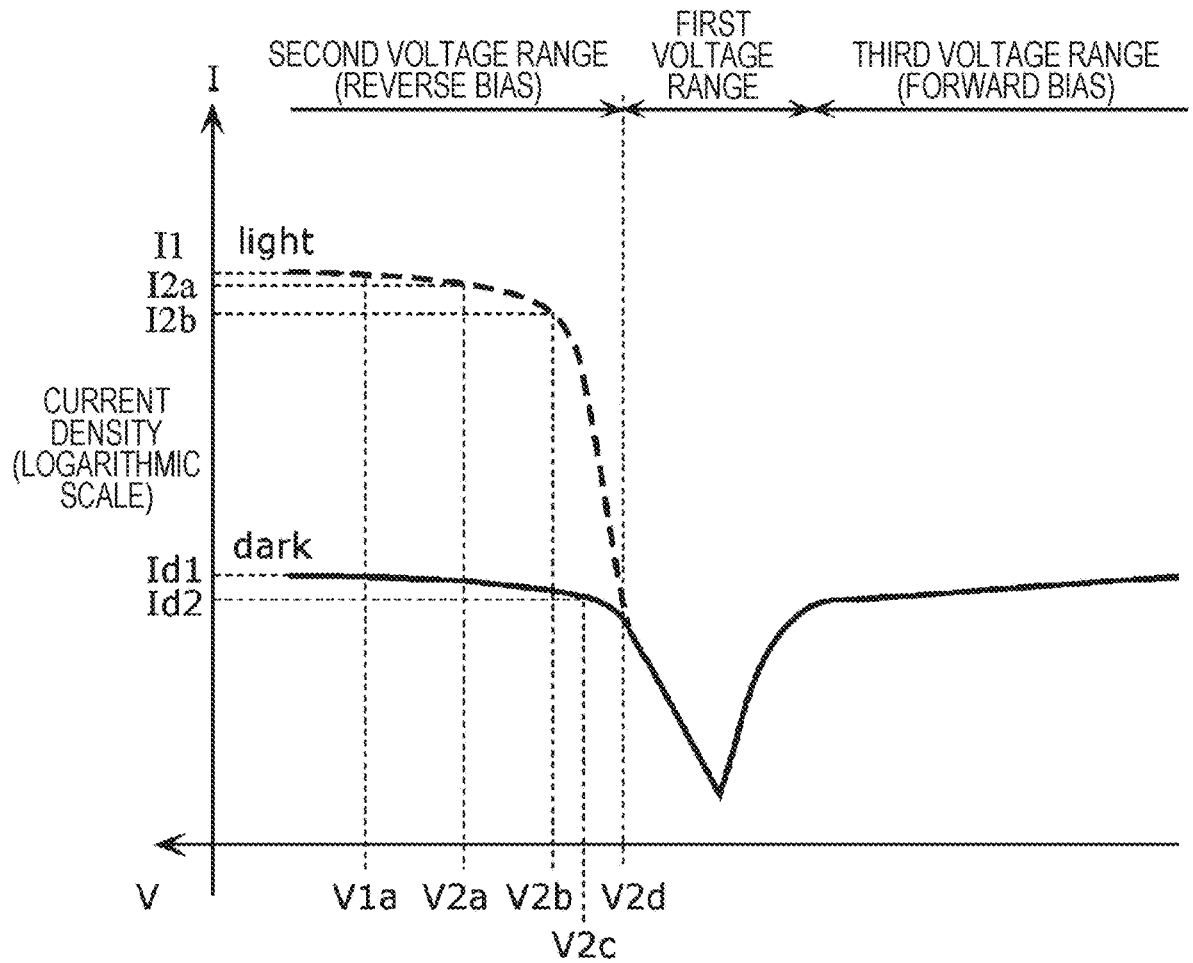
FIG. 11 is a diagram illustrating an example of the current-voltage characteristic of a photoelectric converter for description of second voltage.

FIG. 11 is a diagram illustrating an example of the current-voltage characteristic of the photoelectric converter 20 for description of the second voltage. The horizontal axis illustrated in FIG. 11 represents bias voltage applied between the counter electrode 13 and the pixel electrode 11. The vertical axis illustrated in FIG. 11 represents the absolute value of current flowing between the counter electrode 13 and the pixel electrode 11, that is, current flowing through the photoelectric conversion layer 12. FIG. 11 is a semilogarithmic graph with a logarithm scale on the vertical axis. In FIG. 11, the solid line with "dark" represents the current-voltage characteristic in a dark state in which the imaging element 100 is irradiated with no light. The dashed line with "light" in FIG. 11 represents the current-voltage characteristic in a light state in which the imaging element 100 is irradiated with light of a predetermined intensity. The same expression of "dark" and "light" applies to FIGS. 12 and 13 to be described later.

Voltage V1$a$ illustrated in FIG. 11 is an example of the first voltage. Each of voltages V2$a$ to V2$d$ illustrated in FIG. 11 is an example of the second voltage. The voltage V1$a$ and the voltages V2$a$ to V2$d$ are, for example, reverse bias voltage when the photoelectric conversion layer 12 is regarded as a photodiode. In the present embodiment, reverse bias voltage is voltage with which the potential of the counter electrode 13 is higher than the potential of the pixel electrode 11. Forward bias voltage is voltage with which the potential of the counter electrode 13 is lower than the potential of the pixel electrode 11.

The second voltage is, for example, voltage smaller than the voltage V1$a$. Accordingly, at least electric power consumption corresponding to bias voltage decrease can be reduced. Specifically, since P=VI holds where P represents electric power, V represents voltage, and I represents current, the electric power P decreases in proportion to the decreased voltage V. In addition, current flowing to the photoelectric conversion layer 12 decreases in accordance with bias voltage decrease.

The second voltage may be the voltage V2$a$. The voltage V2$a$ is voltage with which light current amount I2$a$ flows. The light current amount I2$a$ is smaller than a light current amount I1 of light current that flows when the voltage V1$a$ is applied to the photoelectric converter 20. At the voltage V2$a$, the amount of light current flowing to the photoelectric conversion layer 12 is reduced and thus the current I in P=VI contributes to reduction of the electric power P. Since the amount of current flowing to the photoelectric conversion layer 12 decreases, degradation of the photoelectric conversion layer 12 is reduced.

The second voltage may be the voltage V2$b$. The voltage V2$b$ is voltage at which a flowing light current amount I2$b$ is equal to or smaller than 90% of the light current amount I1. Accordingly, electric power consumption can be reduced by 10% or more than in the normal imaging mode, and degradation of the photoelectric conversion layer 12 can be further reduced. The voltage V2$b$ may be voltage at which the light current amount I2$b$ is equal to or smaller than 10% of the light current amount I1.

The second voltage may be the voltage V2$c$. The voltage V2$c$ is voltage at which a flowing current amount Id2 is equal to or smaller than 90% of a dark current amount Id1 that flows when the voltage V1$a$ is applied to the photoelectric converter 20. Accordingly, even when the camera system 300 is placed at a dark place, electric power consumption can be reduced by 10% or higher than in the normal imaging mode, and degradation of the photoelectric conversion layer 12 can be further reduced. In a case where the photoelectric conversion layer 12 has sensitivity to infrared, dark current is likely to be large, and thus the second voltage being equal to or lower than the voltage V2$c$ is particularly effective. The voltage V2$c$ may be voltage at which the dark current amount Id2 is equal to or smaller than 10% of the dark current amount Id1.

The second voltage may be the voltage V2$d$. The voltage V2$d$ is voltage at which the light current amount and the dark current amount become equal to each other as reverse bias voltage decreases. Accordingly, the amount of current flowing to the photoelectric conversion layer 12 can be reduced. Moreover, the amount of current flowing to the photoelectric conversion layer 12 does not change depending on whether light is incident on the imaging element 100, and the same effect of current amount reduction can be obtained irrespective of an environment in which the camera system 300 is placed.

Figure 12:
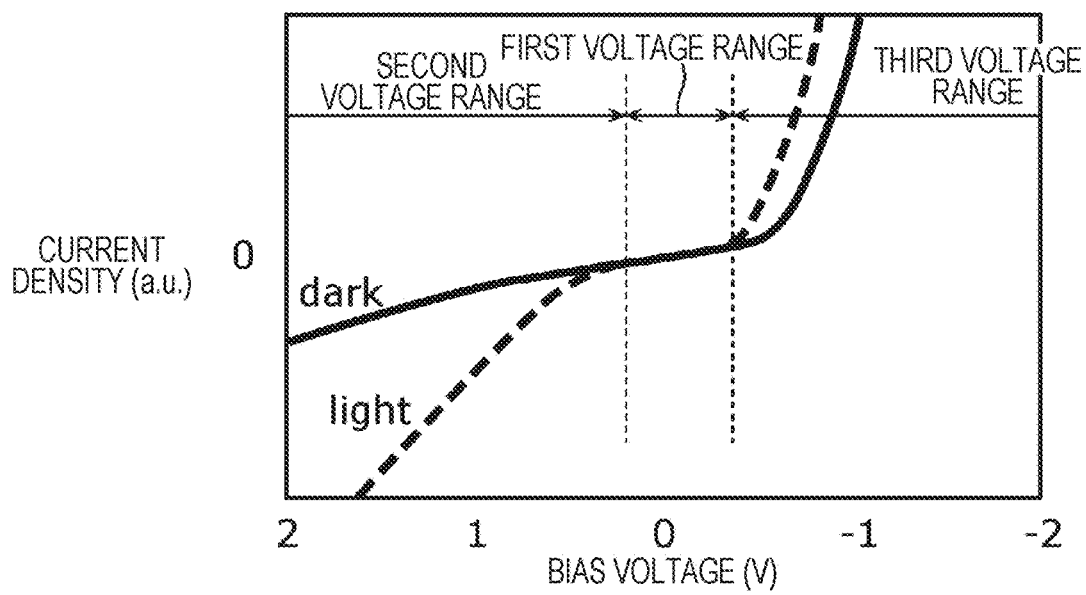
FIG. 12 is a diagram illustrating an example of the current-voltage characteristic of the photoelectric converter for description of a first voltage range.

The second voltage may be voltage in a first voltage range lower than the voltage V2$d$. FIG. 12 is a diagram illustrating an example of the current-voltage characteristic of the photoelectric converter 20 for description of the first voltage range. FIG. 12 illustrates the current-voltage characteristic of the photoelectric converter 20 in the vicinity of the first voltage range. The horizontal axis illustrated in FIG. 12 represents bias voltage applied between the counter electrode 13 and the pixel electrode 11. The vertical axis illustrated in FIG. 12 represents the value of current flowing between the counter electrode 13 and the pixel electrode 11. Note that the current value on the vertical axis is not an absolute value in FIG. 12. The vertical axis in FIG. 12 is not a logarithm axis but a normal numerical axis.

The light current characteristic of the photoelectric converter 20 in the example illustrated in FIG. 12 is schematically characterized by the first voltage range, a second voltage range, and a third voltage range. Accordingly, the photoelectric converter 20 has a light current characteristic with the first voltage range, the second voltage range, and the third voltage range. The second voltage range is the voltage range of reverse bias voltage and is a region in which the absolute value of output current density increases as the reverse bias voltage increases. The third voltage range is the voltage range of forward bias and is a region in which the output current density increases as forward bias voltage increases. The first voltage range is a voltage range between the second voltage range and the third voltage range. The first voltage range is a voltage range in which the density of current flowing between the counter electrode 13 and the pixel electrode 11 when voltage is applied between the counter electrode 13 and the pixel electrode 11 is equivalent between a state with light incidence on the photoelectric conversion layer 12 and a state without light incidence. The current density being equivalent between the state with light incidence on the photoelectric conversion layer 12 and the state without light incidence means the current density being equivalent in effect. For example, in the first voltage range, the ratio of the absolute value of current density in the state with light incidence to the absolute value of current density in the state without light incidence is larger than 1:10 and smaller than 10:1. The state with light incidence may be, for example, light irradiation of 100 mW/cm². The state with light incidence may be, for example, light irradiation of 50 μW/cm² or more when typical indoor illuminance is considered.

With the second voltage in such a first voltage range, the amount of current flowing to the photoelectric conversion layer 12 can be reduced. Moreover, the amount of current flowing to the photoelectric conversion layer 12 does not change depending on whether light is incident on the imaging element 100, and the same effect of current amount reduction can be obtained irrespective of an environment in which the imaging element 100 is placed. Furthermore, the operation range of the second voltage can have a margin.

Such a photoelectric converter 20 having a light current characteristic with the first voltage range can be achieved, for example, through selection of the photoelectric conversion material used for the photoelectric conversion layer 12. The photoelectric conversion material used for the photoelectric conversion layer 12 is not particularly limited as long as the above-described light current characteristic can be achieved, but is, for example, a composite of a donor organic semiconductor material and an acceptor organic semiconductor material.

Note that, in a case where the photoelectric conversion layer 12 is unlikely to degrade irrespective of flow of forward current, the second voltage may be voltage in the third voltage range of forward bias voltage as long as the second voltage is smaller than the first voltage.

Figure 13:
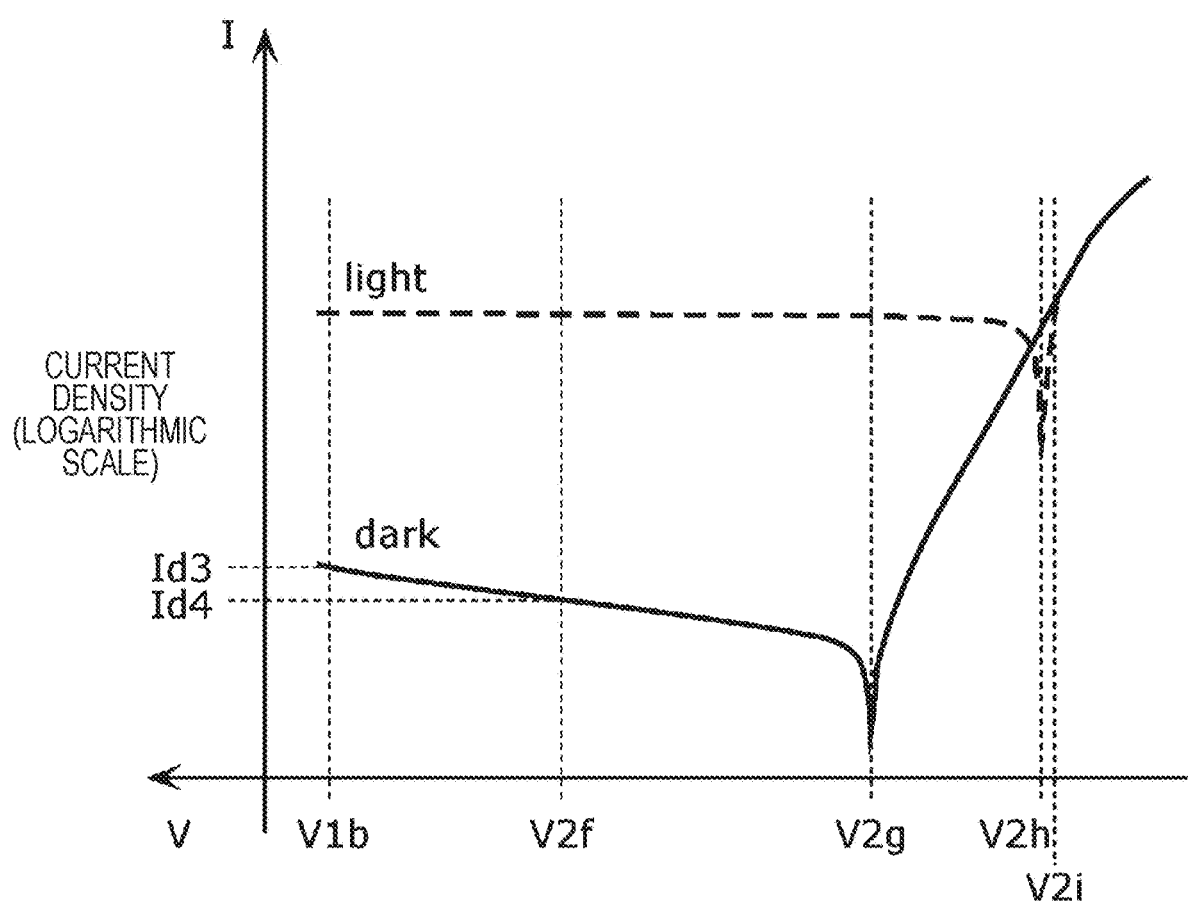
FIG. 13 is a diagram illustrating another example of the current-voltage characteristic of the photoelectric converter for description of the second voltage.

The photoelectric converter 20 may have a current-voltage characteristic different from the current-voltage characteristic illustrated in FIGS. 11 and 12. FIG. 13 is a diagram illustrating another example of the current-voltage characteristic of the photoelectric converter 20 for description of the second voltage. FIG. 13 is, for example, a current-voltage characteristic that can be achieved in a case where a semiconductor quantum dot is used as the photoelectric conversion material. As in FIG. 11, the horizontal axis illustrated in FIG. 13 represents bias voltage applied between the counter electrode 13 and the pixel electrode 11. The vertical axis illustrated in FIG. 13 represents the absolute value of current flowing between the counter electrode 13 and the pixel electrode 11. FIG. 13 is a semilogarithmic graph with a logarithm scale on the vertical axis.

Voltage V1$b$ illustrated in FIG. 13 is an example of the first voltage. Each of voltages V2$f$ to V2$h$ illustrated in FIG. 13 is an example of the second voltage.

The second voltage is, for example, voltage lower than the voltage V1$b$ and higher than voltage V2$i$. Accordingly, electric power consumption corresponding to bias voltage decrease can be reduced and at least one of light current and dark current can be reduced.

The second voltage may be the voltage V2$f$. The voltage V2$f$ is voltage at which a flowing dark current amount Id4 is equal to or smaller than 90% of a dark current amount Id3 that flows when the voltage V1$b$ is applied to the photoelectric converter 20. The voltage V2$f$ may be voltage at which the dark current amount Id4 is equal to or smaller than 10% of the dark current amount Id3.

The second voltage may be the voltage V2$g$. The voltage V2$g$ is voltage at which dark current flowing to the photoelectric conversion layer 12 is smallest. Accordingly, flowing dark current can be minimized.

The second voltage may be the voltage V2$h$. The voltage V2$h$ is voltage at which light current flowing to the photoelectric conversion layer 12 is smallest. Accordingly, flowing light current can be minimized.

Note that the second voltage is not limited to the examples described above with reference to FIGS. 11 to 13 but is set in a range larger than 0 V and smaller than the first voltage in accordance with characteristics of the photoelectric converter 20 or the like.

The voltage V1 and the voltage V2 applied to the counter electrode 13 are set to be, for example, the first voltage and the second voltage described above when the potential Vfd of the electric charge accumulation part 41 is the reset voltage Vr.

As illustrated in FIG. 9, the imaging element 100 subsequently stops part of the operation of the peripheral circuits based on control by the system controller 330 (step S32). Specifically, the imaging element 100 stops part of the operation of the peripheral circuits in the normal imaging mode while the second voltage is applied between the counter electrode 13 and the pixel electrode 11. Thus, the operation sequence of the peripheral circuits is changed from the normal imaging mode. Accordingly, the imaging element 100 applies the second voltage between the counter electrode 13 and the pixel electrode 11 while part of the operation of the peripheral circuits is stopped.

For example, the imaging element 100 stops at least part of the operation of any one of or two or more of constituent components included in the peripheral circuits based on control by the system controller 330. Exemplary methods of stopping the operation include processing of stopping or lowering voltage supply to constituent components to be stopped, processing of stopping supply of an operation clock to constituent components to be stopped, and processing of transferring a control signal that stops operation to constituent components to be stopped. Alternatively, processing of fixing output values from constituent components to be stopped may be performed.

Specifically, examples of circuits at least part of the operation of which is stopped are any one of or two or more of the voltage supply circuit 32, the voltage supply circuit 35, the reset voltage source 34, the vertical scanning circuit 36, the column signal processing circuit 37, the horizontal signal reading circuit 38, and the pixel drive signal generation circuit 39 described above. In a case where the imaging element 100 is provided with a feedback circuit for reducing reset noise, the imaging element 100 may stop a circuit for operating the feedback circuit. All or some of these circuits may be stopped.

As for stopping of part of the operation of the peripheral circuits, specific examples of circuits and operations to be stopped are listed below. Note that the circuits and operations to be stopped are not limited to examples below.

Power supply to each pixel 10 and/or the peripheral circuits is turned off. Alternatively, voltage lower than in operation is supplied to each pixel 10 and/or the peripheral circuits.

The address transistor 26 is constantly turned off.

A selection signal pulse and/or a reset signal pulse from the vertical scanning circuit 36 is stopped.

The vertical scanning circuit 36 is powered off.

The column signal processing circuit 37 is powered off. Alternatively, a column load cell and/or a column comparator circuit in the column signal processing circuit 37 is powered off.

A DAC circuit in the column signal processing circuit 37 is powered off.

Noise cancel operation that reduces reset noise is stopped.

Correlated double sampling operation in the column signal processing circuit 37 is stopped.

Input voltage of an amplifier in the column signal processing circuit 37 is fixed to power voltage or a ground level.

Connection from the pixel 10 to the column signal processing circuit 37 is switched off. Specifically, a switch provided on the vertical signal line 47 between the pixel 10 and the column signal processing circuit 37 is turned off. Alternatively, output from the pixel 10 or a load cell circuit is fixed to a constant value. Alternatively, an input value of a column comparator is fixed to a constant value. Alternatively, an output value of the column comparator is fixed to a constant value.

Output from the DAC circuit as reference voltage for an AD conversion circuit in the column signal processing circuit 37 is fixed to a constant value (for example, the power voltage or the ground level) or set to floating in an impedance state.

The same value is written to a latch memory that holds results of AD conversion at the column signal processing circuit 37, or the same constant value is output from the latch memory.

Pixel drive signal supply by the pixel drive signal generation circuit 39 is stopped.

The operation of a PLL circuit in the pixel drive signal generation circuit 39 is stopped.

The operation of a bandgap reference circuit that generates reference voltage is stopped. Specifically, a bandgap preference circuit stops voltage and/or current supply to each circuit of the imaging element 100.

The operation of the horizontal signal reading circuit 38 is stopped. Alternatively, the horizontal signal reading circuit 38 outputs a constant value.

In a case where the imaging element 100 includes a control circuit, a register signal value transferred from the control circuit or the system controller 330 to each circuit is fixed to a constant value.

A timing generator circuit in the pixel drive signal generation circuit 39 is stopped.

A control pulse from the timing generator circuit in the pixel drive signal generation circuit 39 is stopped.

A switch provided on a power source path from a power supply input-output pad to each circuit of the imaging element 100 is turned off to stop power supply.

The imaging element 100 stops reading operation of signal electric charge as part of the operation of the peripheral circuits. The imaging element 100 may output no image by stopping part of the operation of the peripheral circuits. In this case, for example, the imaging element 100 stops at least one of the column signal processing circuit 37 and the horizontal signal reading circuit 38 at a later stage of the vertical signal line 47. Accordingly, no image is output from the imaging element 100, and thus electric power consumption by the imaging element 100 can be further reduced.

In this manner, in the present embodiment, the imaging element 100 in the low power consumption mode stops part of the operation of the peripheral circuits while the second voltage is applied between the counter electrode 13 and the pixel electrode 11. In the low power consumption mode, the imaging element 100 does not perform, for example, reading operation or the like nor output images. However, in an imaging element disclosed in Japanese Unexamined Patent Application Publication No. 2018-182314, the peripheral circuits sequentially operate to output an image while voltage in the first voltage range is applied to the photoelectric conversion layer.

Note that step S32 may be performed earlier than step S31 at time t1 or later.

The imaging element 100 may output an image signal in the low power consumption mode.

Other Exemplary Operation

Other exemplary operation of the camera system 300 according to the present embodiment will be described below. In the example described below, the above-described operation at step S31 is different from in the first example described above with reference to FIG. 10.

(1) Second Example of Operation Timing of Camera System

Figure 14:
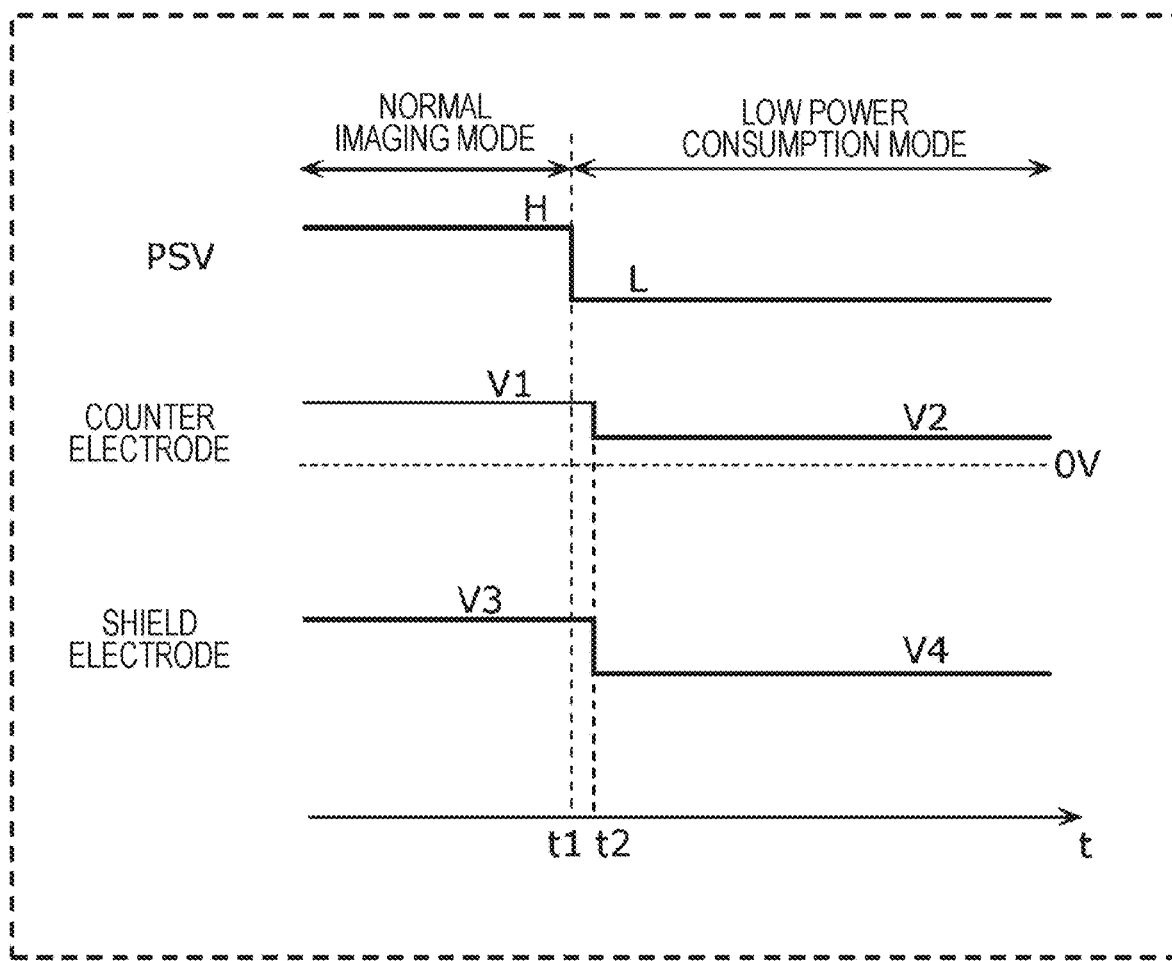
FIG. 14 is a timing chart illustrating a second example of operation timing of the camera system according to the embodiment.

In a case where the imaging element 100 includes the shield electrodes 17 like the imaging element 100 including the pixels 10, voltage applied between the counter electrode 13 and each shield electrode 17 may be additionally changed in the low power consumption mode. FIG. 14 is a timing chart illustrating a second example of the operation timing of the camera system 300. FIG. 14 illustrates, from top, the power save signal PSV, the counter electrode 13, and the voltage level of the shield electrode 17.

As illustrated in FIG. 14, when having received the first input signal at time t1, the system controller 330 sets the power save signal PSV from a high level to a low level for control in the low power consumption mode and activates the low power consumption mode of the imaging element 100. Then, at time t2 after a predetermined transition time from time t1, the imaging element 100 changes voltage supplied to the counter electrode 13 from voltage V1 to voltage V2. The process up to this point is the same as in the above-described first example.

In the second example illustrated in FIG. 14, at step S31, the imaging element 100 also changes, as voltage applied to the photoelectric conversion layer 12, voltage applied between the counter electrode 13 and the shield electrode 17. Specifically, at time t2, the imaging element 100 changes voltage supplied to the shield electrode 17 from voltage V3 to voltage V4.

The voltage V3 is voltage supplied to the shield electrode 17 in the normal imaging mode. Accordingly, the third voltage applied between the counter electrode 13 and the shield electrode 17 in the normal imaging mode is the difference between the voltage V1 and the voltage V3. As described above, the voltage V3 is set to a value corresponding to the reset voltage Vr to prevent movement of signal electric charge between pixels 10.

The fourth voltage applied between the counter electrode 13 and the shield electrode 17 in the low power consumption mode is the difference between the voltage V2 and the voltage V4. The voltage V4 is voltage set in accordance with the voltage V2 so that the fourth voltage becomes smaller than the third voltage. In this manner, the imaging element 100 in the low power consumption mode may apply the fourth voltage smaller than the third voltage between the counter electrode 13 and the shield electrode 17 based on control by the system controller 330. Accordingly, current flowing to the photoelectric conversion layer 12 between the counter electrode 13 and the shield electrode 17 is reduced, and thus the reliability of the imaging element 100 is improved and electric power consumption thereof is reduced.

The voltage V4 may be equal to the voltage V2. Thus, in the low power consumption mode, the imaging element 100 supplies equal voltage to the counter electrode 13 and the shield electrode 17. Accordingly, in the low power consumption mode, the potential difference between the counter electrode 13 and the shield electrode 17 is eliminated and current flowing between the counter electrode 13 and the shield electrode 17 is minimized.

Note that, in the example illustrated in FIG. 14, the imaging element 100 changes voltage supplied to the shield electrode 17 from the voltage V3 to the voltage V4 at time t2, but the present invention is not limited thereto. When the fourth voltage is lower than the third voltage due to the relation between the voltage V3 and the voltage V1 and the relation between the voltage V3 and the voltage V2, the imaging element 100 may maintain voltage supplied to the shield electrode 17 at the voltage V3 after time t2 as well. The timing when the imaging element 100 applies the fourth voltage between the counter electrode 13 and the shield electrode 17 does not necessarily need to be time t2 but may be before or after time t2 as long as the timing is after time t1.

(2) Third Example of Operation Timing of Camera System

Exemplary operation when reset operation is performed in the low power consumption mode will be described below. With the reset operation, application of forward bias voltage to the photoelectric conversion layer 12 and current flow in the forward direction are prevented when the photoelectric conversion layer 12 is regarded as a photodiode. The photoelectric conversion layer 12 is particularly likely to degrade in some cases when current in the forward direction flows, and thus the present operation is particularly effective for improving the reliability of the imaging element 100.

Figure 15:
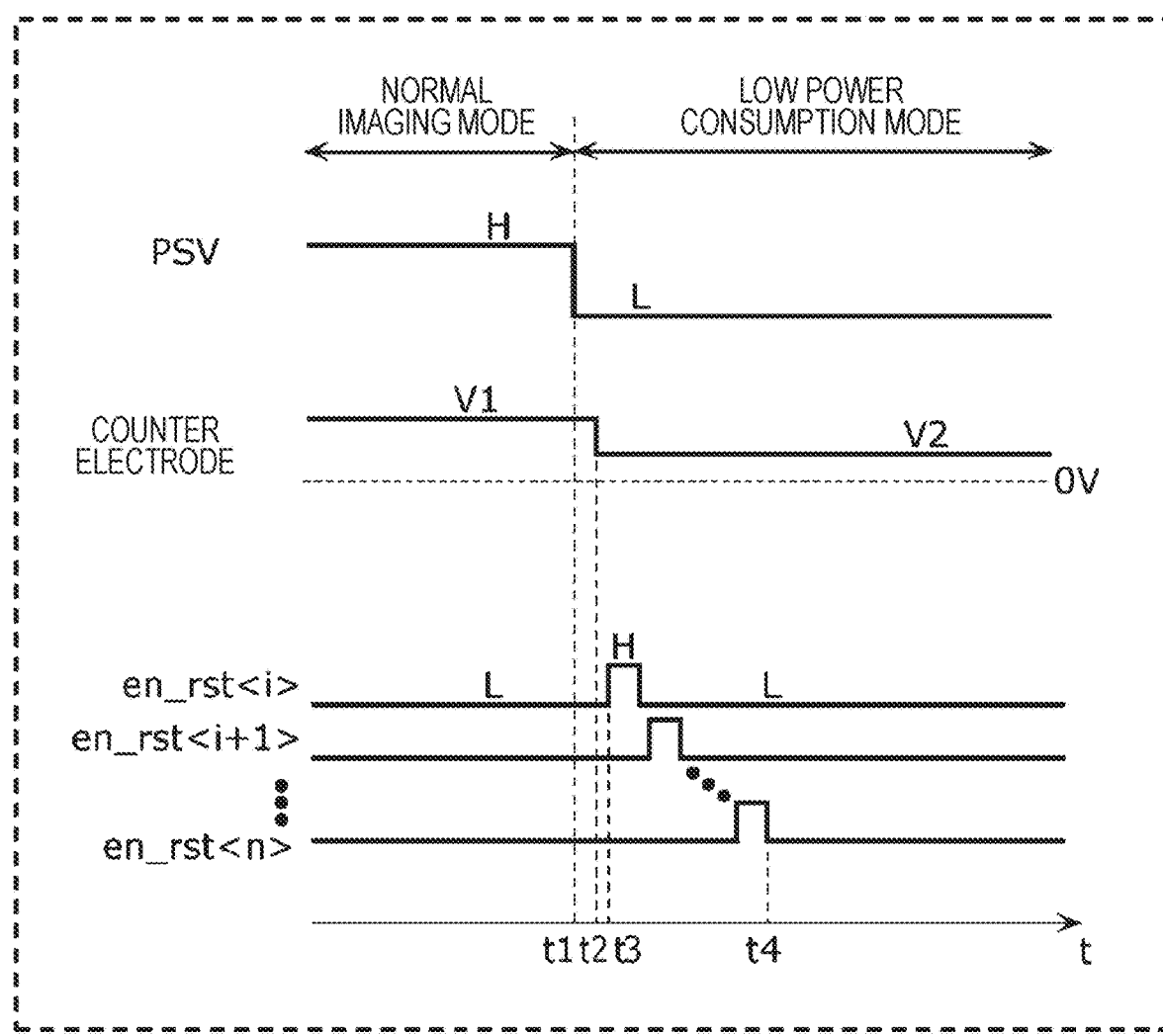
FIG. 15 is a timing chart illustrating a third example of operation timing of the camera system according to the embodiment.

FIG. 15 is a timing chart illustrating a third example of the operation timing of the camera system 300. FIG. 15 illustrates, from top, the power save signal PSV, the counter electrode 13, and the voltage level of the reset control line en_rst on each row. The following description with reference to FIG. 15 is made with an example of the above-described imaging element 100 including the pixels 10, but the same operation is performed also in a case where the imaging element 100 includes the pixels 10a or the pixels 10b.

As illustrated in FIG. 15, when having received the first input signal at time t1, the system controller 330 sets the power save signal PSV from a high level to a low level for control in the low power consumption mode and activates the low power consumption mode of the imaging element 100. Then, at time t2 a predetermined transition time after time t1, the imaging element 100 changes voltage supplied to the counter electrode 13 from the voltage V1 to the voltage V2. The process up to this point is the same as in the above-described first example.

Subsequently, time t3 later than time t2, the imaging element 100 sets the voltage of the reset control line en_rst<i> of the i-th row from a low level to a high level, thereby turning on the reset transistor 28 of each pixel 10 on the i-th row so that the reset voltage Vr is supplied to the electric charge accumulation part 41 of the pixel 10 on the i-th row. Accordingly, the potential of the electric charge accumulation part 41 of each pixel 10 on the i-th row is reset to the reset voltage Vr. In a case where holes are used as signal electric charge, the reset voltage Vr is voltage lower than the voltage V1 and the voltage V2. The i-th row in FIG. 15 is, for example, the first row. After supplying the reset voltage Vr to the electric charge accumulation part 41 of each pixel 10 on the i-th row, the imaging element 100 returns the voltage of the reset control line en_rst<i> from the high level to the low level, thereby turning off the reset transistor 28 of each pixel 10 on the i-th row. After time t3, the imaging element 100 continues supply of the voltage V2 to the counter electrode 13. Accordingly, voltage of the difference between the voltage V2 and the reset voltage Vr is applied as the second voltage between the counter electrode 13 and the pixel electrode 11.

After resetting the potential of the electric charge accumulation part 41 of each pixel 10 on the i-th row, the imaging element 100 sequentially sets the voltages of the reset control line en_rst<i+1> of the (i+1)-th row to the reset control line en_rst<n> of the n-th row to the high level by time t4. Accordingly, the potential of the electric charge accumulation part 41 of each pixel 10 on the (i+1)-th row to the n-th row is reset to the reset voltage Vr for each pixel row. As a result, the potential of the electric charge accumulation part 41 of every pixel 10 in the imaging element 100 is reset to the reset voltage Vr.

Note that the reset operation is performed for pixel row in the example illustrated in FIG. 15, but at the timing of time t3 later than time t2, the imaging element 100 may set the reset control line en_rst of every row to the high level so that the potential of the electric charge accumulation part 41 of every pixel 10 is reset to the reset voltage Vr by batch.

Effects in a case where the reset operation is performed in the low power consumption mode will be described below with reference to FIGS. 16 to 19. FIGS. 16 to 19 are schematic diagrams for description of the potentials of the counter electrode 13 and the electric charge accumulation part 41 at each time point when the reset operation is performed in the low power consumption mode. The description of FIGS. 16 to 19 will be made on an example of the voltage V1=5.0 V, the voltage V2=2.0 V, and the reset voltage Vr=0.5 V. Note that such voltage values are exemplary and not particularly limited as long as the relation of V1>V2>Vr holds when signal electric charge is holes. In FIGS. 16 to 19, the photoelectric conversion layer 12 and the electric charge accumulation part 41 are schematically illustrated as diodes.

Figure 16:
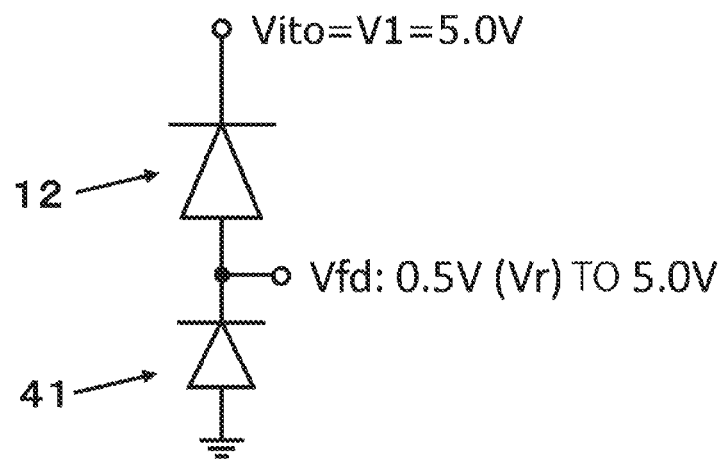
FIG. 16 is a schematic diagram for description of the potential of a counter electrode and the potential of an electric charge accumulation part at a time in a case where reset operation is performed in the low power consumption mode.

First, as illustrated in FIG. 16, before time t1, the voltage V1 is supplied to the counter electrode 13 since control is performed in the normal imaging mode. Thus, the potential Vito of the counter electrode 13 is Vito=V1=5.0 V. In this case, current in accordance with the amount of light incident on the photoelectric conversion layer 12 flows from the counter electrode 13 to the electric charge accumulation part 41 and signal electric charge is accumulated in the electric charge accumulation part 41, and thus the potential Vfd of the electric charge accumulation part 41 varies in accordance with time and the amount of light incident on the photoelectric conversion layer 12 and is not constant. Moreover, the potential Vfd of the electric charge accumulation part 41 is different among the pixels 10. Specifically, the potential Vfd of the electric charge accumulation part 41 of each pixel 10 is potential between the reset voltage Vr when the electric charge accumulation part 41 is reset and the voltage V1, that is, potential in the range of 0.5 V to 5.0 V. Thus, the diode corresponding to the photoelectric conversion layer 12 and the diode corresponding to the electric charge accumulation part 41 are both in a reverse bias state in which reverse bias voltage is applied. Note that in a case where an overflow mechanism clip circuit or the like is connected to the electric charge accumulation part 41, the potential Vfd of the electric charge accumulation part 41 is potential between the reset voltage Vr and clip voltage. For example, in a case where the clip voltage is 3.0 V, the potential Vfd of the electric charge accumulation part 41 is potential in the range of 0.5 V to 3.0 V.

Figure 17:
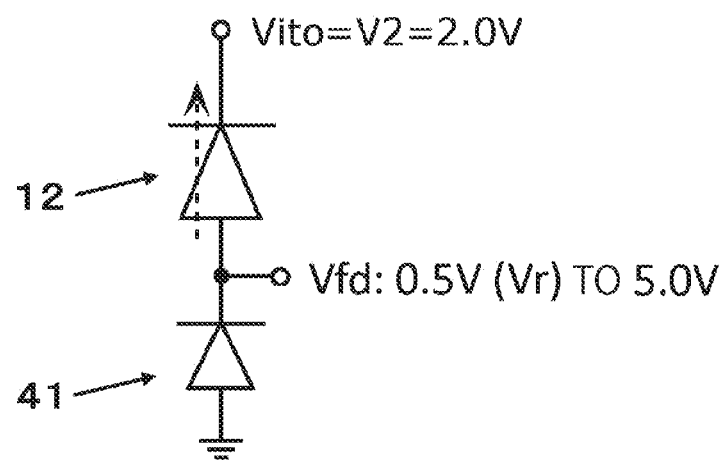
FIG. 17 is a schematic diagram for description of the potential of the counter electrode and the potential of the electric charge accumulation part at a time in a case where reset operation is potentially performed in the low power consumption mode.

Subsequently, as illustrated in FIG. 17, at time t2, the voltage V2 is supplied to the counter electrode 13. Accordingly, the potential Vito of the counter electrode 13 becomes Vito=V2=2.0 V. In this case, the potential Vfd of the electric charge accumulation part 41 does not change from before time t1 and is in the range of 0.5 V to 5.0 V. Thus, the diode corresponding to the electric charge accumulation part 41 is in the reverse bias state. When the amount of signal electric charge accumulated in the electric charge accumulation part 41 is small and the potential Vfd is lower than 2.0 V, the state in which reverse bias voltage is applied to the photoelectric conversion layer 12 is maintained. However, since the potential Vfd is 5.0 V at maximum, forward bias voltage is applied to the photoelectric conversion layer 12 in some cases. Thus, when such a forward bias state in which forward bias voltage is applied is held, current in the forward direction continues flowing to the photoelectric conversion layer 12 as illustrated with an arrow in FIG. 17, and degradation of the photoelectric conversion layer 12 is potentially promoted depending on the configuration of the photoelectric conversion layer 12.

Figure 18:
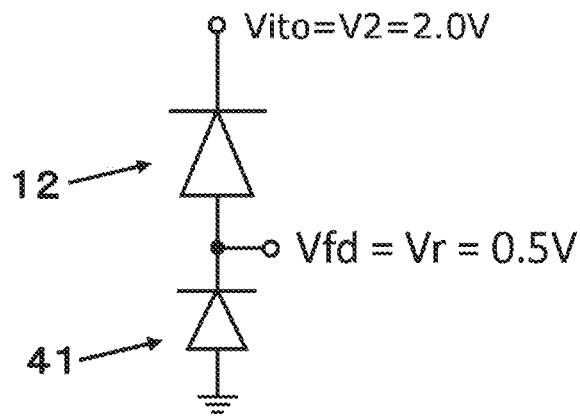
FIG. 18 is a schematic diagram for description of the potential of the counter electrode and the potential of the electric charge accumulation part at a time in a case where reset operation is potentially performed in the low power consumption mode.

Subsequently, as illustrated in FIG. 18, at time t3, the reset voltage Vr is supplied to the electric charge accumulation part 41. Accordingly, the potential Vfd of the electric charge accumulation part 41 becomes Vfd=Vr=0.5 V. As a result, the potential Vfd becomes lower than the potential Vito of 2.0 V so that reverse bias voltage is applied to the photoelectric conversion layer 12. The diode corresponding to the electric charge accumulation part 41 is in the reverse bias state. Thus, with such operation, even when a state in which forward bias voltage is applied to the photoelectric conversion layer 12 occurs, a state where forward bias voltage is applied to the photoelectric conversion layer 12 can be avoided in a short time.

Through the operation as described above, even when current in the forward direction flows to the photoelectric conversion layer 12 because of variation in the potential Vfd of the electric charge accumulation part 41 among the pixels 10 or due to the timing when control is started in the low power consumption mode, it is possible to avoid, as a temporary state, a state in which current in the forward direction flows.

Moreover, since the voltage V2 when the reset voltage Vr is supplied to the electric charge accumulation part 41 after the voltage V2 is applied to the counter electrode 13 is between the voltage V1 and the reset voltage Vr, specifically, satisfies the relation of V1>V2>Vr in the present embodiment, two problems below can be simultaneously solved.

The first problem is variance of the potential Vfd among the pixels 10 after the electric charge accumulation part 41 is reset with the reset voltage Vr. Specifically, when the reset voltage Vr is supplied to the electric charge accumulation part 41 through the reset transistor 28, the potential Vfd of the electric charge accumulation part 41 does not precisely become equal to the reset voltage Vr but varies among the pixels 10 in some cases due to kT/C noise called reset noise, which occurs as the reset transistor 28 is turned on and off.

The second problem is current flow to the photoelectric conversion layer 12 because of potential difference between the counter electrode 13 and the electric charge accumulation part 41 due to the difference between the voltage V2 and the reset voltage Vr. When the potential difference is reduced to zero as much as possible, it is difficult to align the potential difference between the counter electrode 13 and the electric charge accumulation part 41 to zero in all pixels 10 right after reset because of the first problem of variance in the potential Vfd of the electric charge accumulation part 41 among the pixels 10. For example, bias voltage can be minimized by setting the voltage V2 to be equal to the reset voltage Vr, but in reality, due to influence of reset noise, the potential Vfd of the electric charge accumulation part 41 varies and some pixels 10 are in the forward bias state after reset operation. For example, even when the reset voltage Vr is set to 2.0 V, which is equal to the voltage V2, the potential Vfd of the electric charge accumulation part 41 potentially becomes 2.1 V in some cases due to influence of reset noise and the forward bias state occurs.

Figure 19:
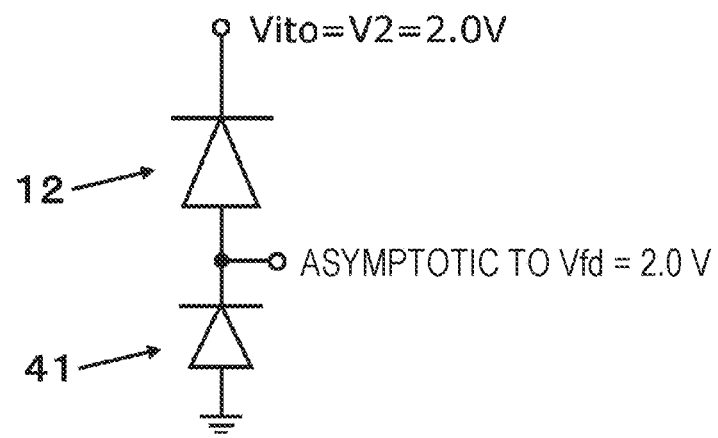
FIG. 19 is a schematic diagram for description of the potential of the counter electrode and the potential of the electric charge accumulation part at a time in a case where reset operation is potentially performed in the low power consumption mode.

These problems are solved by a phenomenon that occurs after time t3. As illustrated in FIG. 19, after time t3, since the low power consumption mode continues, the potential Vito of the counter electrode 13 is higher than the potential Vfd of the electric charge accumulation part 41, and accordingly, at least one of light current and dark current in a smaller amount than in the normal imaging mode continues flowing to the photoelectric conversion layer 12. With this small amount of current, the potential Vfd increases and becomes asymptotically equal to the potential Vito=2.0 V and bias voltage applied to the photoelectric conversion layer 12 approaches to zero. In other words, with the small amount of current due to own potential difference, bias voltage between the counter electrode 13 and the pixel electrode 11 decreases, and accordingly, the sensitivity of the photoelectric converter 20 decreases.

Through reset operation with such a relation of V1>V2>Vr being satisfied, the potential Vfd of the electric charge accumulation part 41 in every pixel 10 can be set closer to the potential Vito of the counter electrode 13 to reduce current flowing to the photoelectric conversion layer 12 even when the potential Vfd of the electric charge accumulation part 41 after the reset operation varies due to reset noise. Thus, reset operation of each pixel 10 in the low power consumption mode does not need to use various conventional reset schemes (such as active reset, feedback reset, flash reset, and CDS operation) that reduce reset noise, but may be a method such as strong inversion reset only, which can be executed in a simple manner in a short time. Since such a simple method can be used, it is possible to reduce electric power consumption due to reset operation and the time of reset operation. As a result, a time in which current in the forward direction flows to the photoelectric conversion layer 12 is reduced so that degradation of the photoelectric conversion layer 12 can be further reduced and electric power consumption thereof can be further reduced.

Moreover, since the above-described effect is obtained without completely reducing the potential difference between the counter electrode 13 and the electric charge accumulation part 41 to zero right after reset operation, it is possible to ensure margins for various kinds of voltage variance such as variance in set voltage for actual circuits.

The voltage V2 is voltage between the voltage V1 and the reset voltage Vr. Since the second voltage is smaller than the first voltage and larger than 0 V, the voltage V2 is voltage different from the voltage V1 and the reset voltage Vr. The voltage V1, the voltage V2, and the reset voltage Vr are set in accordance with, for example, the size of reset noise of the imaging element 100. Specifically, the voltage V1, the voltage V2, and the reset voltage Vr are set in ranges with which, for example, the difference between the voltage V2 and the reset voltage Vr is equal to or larger than the size (for example, maximum amount) of reset noise of the imaging element 100 and equal to or smaller than the difference between the voltage V1 and the reset voltage Vr.

Note that, in the third example as well, the imaging element 100 may apply the fourth voltage between the counter electrode 13 and the shield electrode 17 at time t2 in a case where the imaging element 100 includes the shield electrode 17 as in the above-described second example.

In a case where an overflow mechanism clip circuit or the like is connected to the electric charge accumulation part 41, the imaging element 100 in the low power consumption mode may switch clip voltage to voltage closer to the voltage V2 or may perform operation that deactivates the clip circuit or overflow operation.

OTHER EMBODIMENTS

Although the camera system according to the present disclosure is described above based on the embodiment, the present disclosure is not limited to the embodiment.

Figure 20:
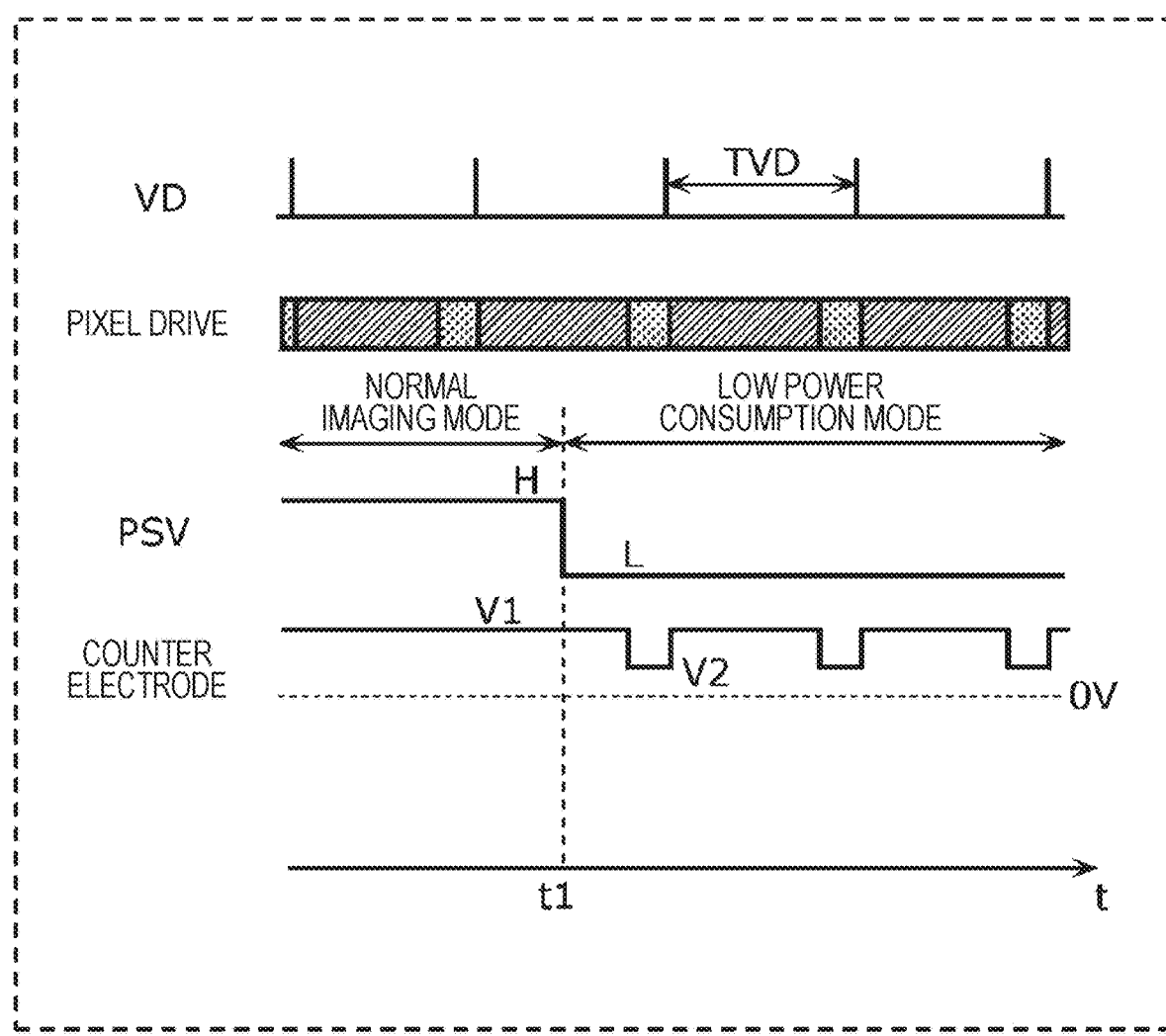
FIG. 20 is a timing chart illustrating a modification of operation timing of the camera system according to the embodiment.

For example, in the above-described embodiment, the imaging element 100 in the low power consumption mode continuously supplies the voltage V2 to the counter electrode 13 after time t2, but the present invention is not limited thereto. In the low power consumption mode, the imaging element 100 may supply the voltage V2 to the counter electrode 13 only in a partial duration. FIG. 20 is a timing chart illustrating a modification of the operation timing of the camera system 300. FIG. 20 illustrates, from top, the voltage level of the vertical synchronizing signal VD, the drive timing of each pixel 10, the voltage level of the power save signal PSV, and the voltage level of the counter electrode 13. For the drive timing of each pixel 10, each imaging duration in which exposure and reading of signal electric charge are performed is illustrated with a hatched rectangle, and each vertical blanking period is illustrated with a dotted rectangle. As illustrated in FIG. 20, for example, the imaging element 100 may supply the voltage V2 to the counter electrode 13 only in the vertical blanking periods after time t1 when the power save signal PSV becomes a low level.

The above description of the embodiment is made on a case where signal electric charge is hole, but in a case where signal electric charge is electrons, as well, it is possible to achieve the effect of improving the reliability of the imaging element 100 and reducing electric power consumption thereof by controlling the imaging element 100 in the low power consumption mode. For example, the effect can be achieved by inverting the polarity of applied voltage in the above-described description.

The camera system does not necessarily need to include all constituent components in the above description of the embodiment but may be constituted by only constituent components for performing intended operation.

Processing executed by a particular processing unit in the above-described embodiment may be executed by another processing unit. The order of a plurality of pieces of processing may be changed, and a plurality of pieces of processing may be executed in parallel.

Each constituent component in the above-described embodiment may be implemented by executing a software program suitable for the constituent component. Each constituent component may be implemented by a program execution unit such as a CPU or a processor reading and executing a software program recorded in a recording medium such as a hard disk or a semiconductor memory.

Each constituent component may be implemented by hardware. Each constituent component may be a circuit (or integrated circuit). Such circuits may constitute one circuit as a whole or may be separate circuits. The circuits may be each a general-purpose circuit or a dedicated circuit.

Any general or specific aspect of the present disclosure may be implemented by a system, a device, a method, an integrated circuit, a computer program, or a computer-readable recording medium such as a CD-ROM. Alternatively, any general or specific aspect of the present disclosure may be implemented by optional combination of a system, a device, a method, an integrated circuit, a computer program, and a recording medium.

For example, the present disclosure may be implemented as the camera system of the above-described embodiment, may be implemented as a control device configured to control an imaging element, may be implemented as a computer program for causing a computer to execute an imaging element control method performed by a system controller, or may be implemented as a non-transitory computer-readable recording medium in which such a computer program is recorded.

Other embodiments and examples provided with various kinds of deformation that could be thought of by the skilled person in the art and any other form established by combining some constituent components in the embodiment and examples are included in the range of the present disclosure without deviation from the gist of the present disclosure.

A camera system according to the present disclosure is applicable to various camera systems and sensor systems such as mobile systems, medical systems, monitoring systems, on-board systems, measurement systems including distance measurement systems, drone systems, and robot systems.

What is claimed is:

1. A control method for an imaging element including a photoelectric converter and a peripheral circuit connected to the photoelectric converter, the photoelectric converter including a first electrode, a second electrode facing the first electrode, and a photoelectric conversion layer disposed between the first electrode and the second electrode, the control method comprising:
    receiving a predetermined input signal; and
    controlling the imaging element by switching between a normal imaging mode and a low power consumption mode based on the predetermined input signal, wherein
        in the normal imaging mode, the imaging element is controlled to apply first voltage between the first electrode and the second electrode, and
        in the low power consumption mode, the imaging element is controlled to apply second voltage between the first electrode and the second electrode and to stop part of operation of the peripheral circuit, the second voltage being larger than 0 V and smaller than the first voltage.

2. The control method for the imaging element according to claim 1, wherein in the low power consumption mode, the imaging element is controlled to apply the second voltage between the first electrode and the second electrode for one frame duration or longer.

3. The control method for the imaging element according to claim 1, wherein
    the imaging element further includes a third electrode facing the first electrode with the photoelectric conversion layer interposed between the first electrode and the third electrode,
    in the normal imaging mode, the imaging element is controlled to apply third voltage between the first electrode and the third electrode, and
    in the low power consumption mode, the imaging element is controlled to apply fourth voltage between the first electrode and the third electrode, the fourth voltage being smaller than the third voltage.

4. The control method for the imaging element according to claim 3, wherein in the low power consumption mode, the imaging element is controlled to apply the second voltage between the first electrode and the second electrode and to apply the fourth voltage between the first electrode and the third electrode by supplying equal voltage to each of the first electrode and the third electrode.

5. The control method for the imaging element according to claim 1, wherein
the photoelectric converter has a light current characteristic with a first voltage range in which current density flowing between the first electrode and the second electrode upon voltage application between the first electrode and the second electrode is equivalent between a state with light incidence and a state without light incidence, and
the second voltage is included in the first voltage range.

6. The control method for the imaging element according to claim 1, wherein
the second electrode is connected to an electric charge accumulation part,
in the low power consumption mode, the imaging element is controlled to apply the second voltage between the first electrode and the second electrode by supplying predetermined voltage to the first electrode and then supplying reset voltage for resetting potential of the electric charge accumulation part to the electric charge accumulation part, and
the predetermined voltage has a value between the reset voltage and voltage supplied to the first electrode when the first voltage is applied between the first electrode and the second electrode.

7. The control method for the imaging element according to claim 1, wherein in the low power consumption mode, the imaging element is controlled to stop part of operation of the peripheral circuit so that no image is output.

8. A camera system comprising:
an imaging element including a photoelectric converter and a peripheral circuit connected to the photoelectric converter, the photoelectric converter including a first electrode, a second electrode facing the first electrode, and a photoelectric conversion layer disposed between the first electrode and the second electrode; and
a controller,
wherein the controller
receives a predetermined input signal,
controls the imaging element by switching between a normal imaging mode and a low power consumption mode based on the predetermined input signal,
controls the imaging element to apply first voltage between the first electrode and the second electrode in the normal imaging mode, and
controls the imaging element to apply second voltage between the first electrode and the second electrode and to stop part of operation of the peripheral circuit in the low power consumption mode, the second voltage being larger than 0 V and smaller than the first voltage.

* * * * *